United States Patent [19]
Fujita et al.

[11] Patent Number: 6,009,200
[45] Date of Patent: *Dec. 28, 1999

[54] DYNAMIC IMAGE PROCESSING APPARATUS AND METHOD

[75] Inventors: Masahiro Fujita, Saitama; Jin Sato; Hiroshi Abe, both of Tokyo, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/723,371

[22] Filed: Sep. 30, 1996

Related U.S. Application Data

[63] Continuation of application No. 08/165,710, Dec. 13, 1993, abandoned.

[30] Foreign Application Priority Data

Dec. 17, 1992 [JP] Japan .................................. 4-355001
Dec. 19, 1992 [JP] Japan .................................. 4-356938

[51] Int. Cl.$^6$ .............................. G06K 9/36; G06K 9/46
[52] U.S. Cl. .......................................... 382/232; 382/243
[58] Field of Search ................................. 382/236, 239, 382/232, 243, 290, 248; 348/396, 402, 412, 415, 430, 438, 395

[56] References Cited

U.S. PATENT DOCUMENTS

| | | | |
|---|---|---|---|
| 4,590,606 | 5/1986 | Rohrer | 382/7 |
| 4,891,643 | 1/1990 | Mitchell et al. | 341/107 |
| 4,903,018 | 2/1990 | Wiebach et al. | 341/51 |
| 4,947,447 | 8/1990 | Miyaoka et al. | 382/56 |
| 5,121,191 | 6/1992 | Cassereau et al. | 348/443 |
| 5,166,987 | 11/1992 | Kageyama | 382/56 |
| 5,237,625 | 8/1993 | Yamashita et al. | 382/22 |
| 5,253,056 | 10/1993 | Pari et al. | 358/133 |
| 5,282,255 | 1/1994 | Bovik et al. | 382/239 |
| 5,311,305 | 5/1994 | Mahadevan et al. | 348/169 |
| 5,339,390 | 8/1994 | Robertson et al. | 395/161 |
| 5,359,438 | 10/1994 | Maeda | 358/539 |
| 5,361,147 | 11/1994 | Katayama et al. | 358/532 |
| 5,416,606 | 5/1995 | Kamayama et al. | 358/467 |
| 5,485,533 | 1/1996 | Hatano et al. | 382/236 |

OTHER PUBLICATIONS

W. Pennebaker and J. Mitchell, JPEG still image data compression standard, Van Nostrand Reinhold, N.Y., 1993, pp. 444–446.

*Primary Examiner*—Phuoc Tran
*Attorney, Agent, or Firm*—Jay H. Maioli

[57] ABSTRACT

A method and apparatus for dynamic image processing in which an image is compressed and subsequently expanded or synthesized into an image for display, wherein the image processing is carried out by considering the image information as distributed in a three-dimensional space composed of the two-dimensional image plane and a time axis defined by the time of each of successive video image frames of the input video signal. A multiple resolution filter is employed that has different resolutions provided by increased orders of differentiation and two-dimensional image data is analyzed as it is distributed along the time axis. Signal compression is provided by coding the positional information of the edge points of the image and this is accomplished by detecting characteristic points corresponding to extreme values of the three-dimensional image information and then compressing the image information on the two-dimensional plane to obtain compressed positional information and also compressing the three-dimensional information and then coding both of these compressed information signals for transmission or recording.

30 Claims, 16 Drawing Sheets

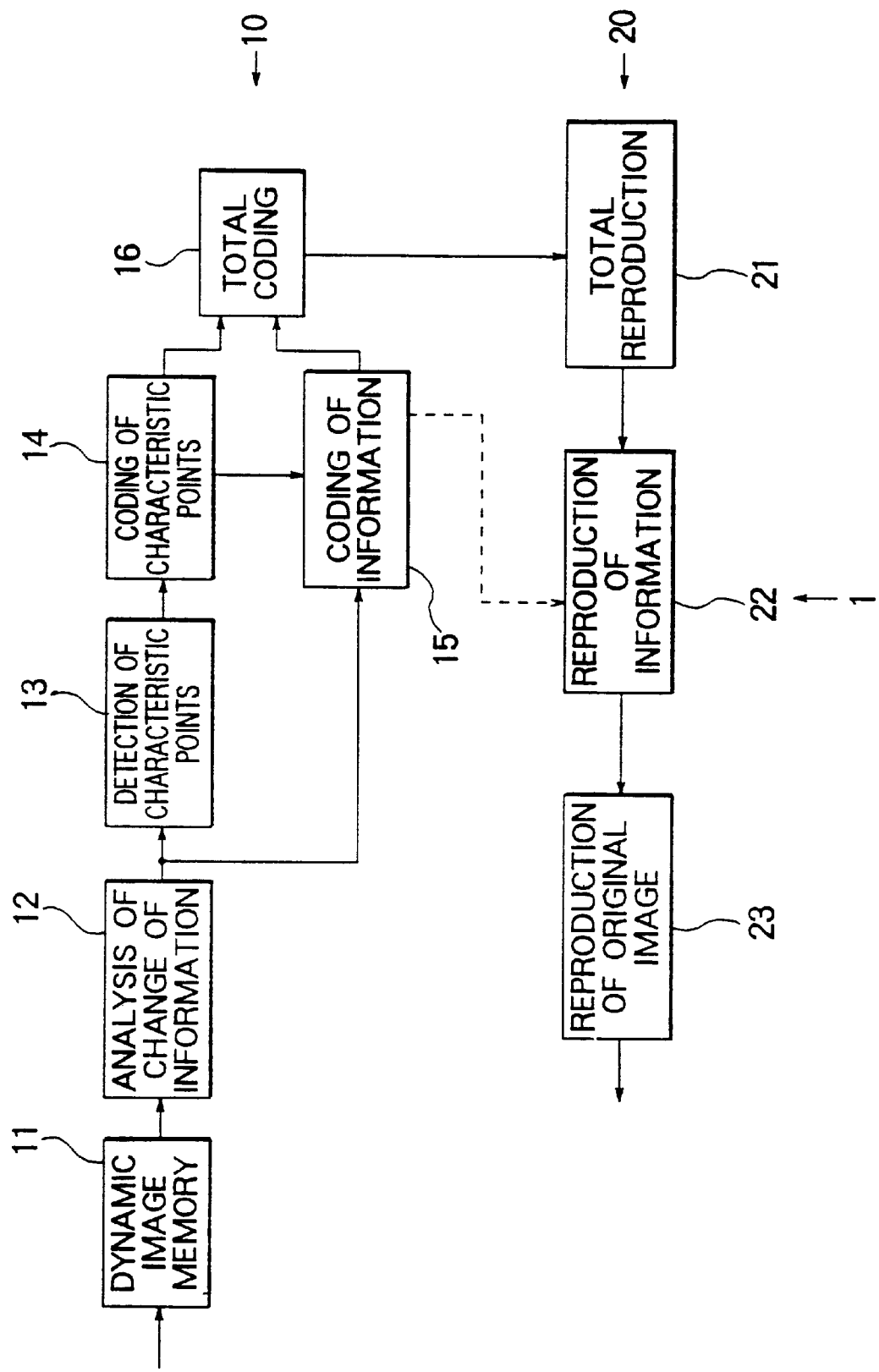

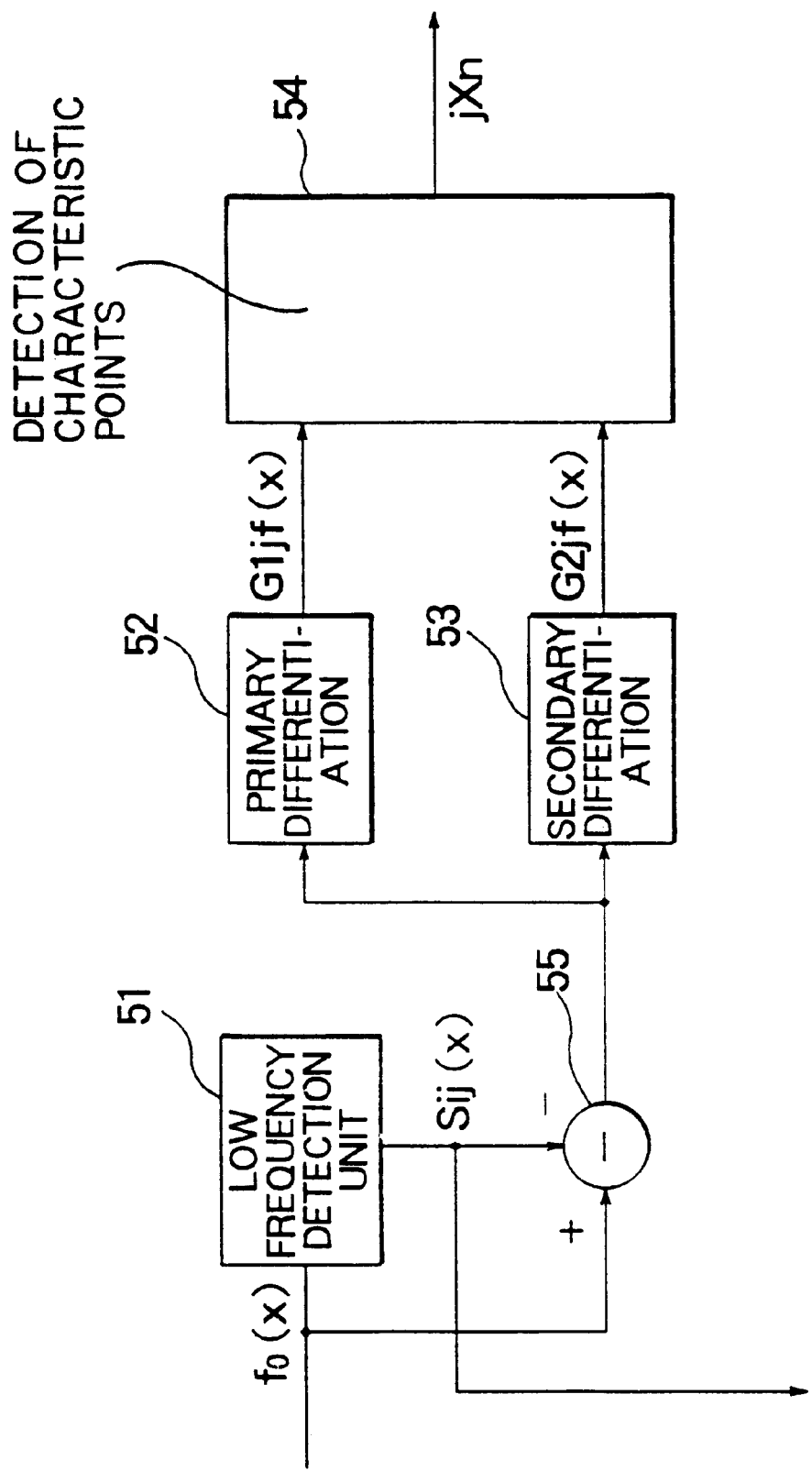

DYNAMIC IMAGE PROCESSING APPARATUS AND METHOD

This is a continuation of application Ser. No. 08/165,710 filed Dec. 13, 1993 now abandoned.

BACKGROUND OF THE INVENTION

1. Field of the Invention

The present invention relates to an image processing apparatus and method for analyzing and synthesizing signals of a dynamic image etc. utilized in fields of image recording, communications, etc.

2. Description of the Related Art

In recent years, as an approach for the analysis and synthesis of image signals etc., for example, a method has been reported in which note is taken of the edges of the signals, such as the boundary between the object and background in the input signals, and original signals are synthesized from the information at the edges of the signals.

For example, the image processing apparatus and method disclosed in "Second Generation Compact Image Coding With Wavelet" by Jacques Froment and Stephane Mallet, Wavelets—Tutorial in Theory and Applications, II: pages 655 to 678, 1991 (hereinafter, reference document 1) is one of the above-described methods. An explanation will be made below of this method.

FIGS. 1A to 1F are views showing one-dimensional signals f(x).

First, a one-dimensional signal f(x) as shown in FIGS. 1A and 1D is assumed. In this example, analysis is first carried out on the signal f(x) using the multiple resolution method.

Here, the "multiple resolution method" means a method of analyzing a signal using a filter having a number of different resolutions.

The characteristic (function) of the analyzing filter used in the analysis using this multiple resolution method is expressed by $\phi_a(x)$. This function $\phi_a(x)$ is expressed by the following equation in a frequency domain (region) $\omega$.

$$\hat{\phi}_a(\omega) = -i\omega \left[ \frac{\sin(\omega/4a)}{(\omega/4a)} \right]^3 \qquad (1)$$

Note, the "a" of the filter function $\phi_a(x)$ expresses the scale in the multiple resolution. Also, the "i" in equation 1 expresses an imaginary number. Also, ^ (hat) expresses a Fourier transformation of the function given this symbol (the same below).

This is similarly the result of differentiation of the function $\theta(x)$ in the original region x of the function expressed by the following equation in the frequency domain $\omega$.

$$\hat{\theta}_a(\omega) = \left[ \frac{\sin(\omega/4a)}{(\omega/4a)} \right]^3 \qquad (2)$$

The result by convolution computation of the filter function $\phi_a(x)$ and the signal f(x) is expressed as a function $W_a f(x)$. In the above reference document 1, it was indicated that an original signal can be approximated using just the filter output $W_a f(a \times n)$ of the position ($a \times n$) (note, n denotes a natural number) giving the maximum value of this amplitude $|W_a f(x)|$.

Before explaining the restoration of the image signal from the maximum value, an explanation will be made concerning the restoration of the original signal f(x) from $W_a f(x)$.

The method mentioned here is called a "wavelet" method and has been studied in depth in recent years.

Where the analysis function is expressed by the following equation:

$$\phi_j(\omega) = -i\omega \left[ \sin(2^{-j}\omega/4)/(2^{-j}\omega/4) \right]^3 \qquad (3)$$

a filter function $\phi_j^*(x)$ used for the synthesis is expressed by the following equation:

$$\hat{\phi}_j*(\omega) = \frac{\overline{\hat{\phi}_j(\omega)}}{\sum_{j=j1}^{jJ} \left\| \hat{\phi}(2^{-j}\omega) \right\|^2} \qquad (4)$$

Here, the line (⁻) drawn over the function expresses a complex conjugate. Also, the scale "a" is selected so that "a" becomes equal to 2j. Note, j=j1, ..., jJ.

Here, summarizing the analysis and synthesis, if the original signal is defined as $f_0(x)$, the following is established:

$$S_{jJ}(x) = \theta_{jJ}(x) * f_0(x) \qquad (5)$$

$$f(x) = f_0(x) - S_{jJ}(x) \qquad (6)$$

and $$W_j f(x) = \phi_j(x) * f(x) \qquad (7)$$

where, j=j1, ..., jJ is analyzed, and synthesis is performed by:

$$f(x) = \sum_{j=j1}^{jJ} \phi_j^*(x) * W_j f(x) \qquad (8)$$

$$f_0(x) = f(x) + S_{jJ}(x) \qquad (9)$$

In this way, the original signal $f_0(x)$ can be restored from $W_j f(x)$ and $S_{jJ}(x)$.

Accordingly, by interpolating 'W$_j$f(x) from the previously mentioned W$_j$f(xn), W$_j$f(x) is approximated, and an approximation of f can be obtained by the above-mentioned inverse transformation. The method of interpolation is one in which when it is assumed that the function obtained by interpolation is W$_j$f(x), by using the fact that a function such as:

$$e(x) = W_j f(x) - 'W_j f(x) \qquad (10)$$

is transformed to a form such as:

$$e(x) = \alpha \exp(Ax) + \beta \exp(-Ax) \qquad (11)$$

and it passes through two points jxn and jx(n+1), u1 and v1 in the above equation are found from:

$$e(jx_n) = W_j f(jx_n) - 'W_j f(jx_n) \qquad (12)$$

$$e(jx_{n+1}) = W_j f(jx_{n+1}) - 'W_j f(jx_{n+1}) \qquad (13)$$

they are substituted in equation 11, which is added to the interpolation function, whereby the interpolation function is renewed.

In this, an estimated value f'(x) of the signal f(x) is found using equation 8, which is re-defined as W$_j$f(x) using equation 7 again. By repeating this, f'(x) is renewed to restore f(x).

Finally, $f_0(x)$ is obtained using equation 9.

The above-mentioned method of signal analysis and synthesis has the problems as mentioned below.

For example, where the input signal $f_0(x)$ has a waveform as shown in FIG. 1A, the result of analysis for this signal by an analyzing filter of the type performing a first order differentiation becomes a waveform as shown in FIG. 1B, and the maximum point of absolute value of amplitude of waveform of the result of analysis exists at the two points indicated by (a) and (b) in FIG. 1B.

On the other hand, the result of analysis by the analyzing filter of the type performing a second order differentiation on the same signal $f_0(x)$ becomes a waveform as shown in FIG. 1C, and the maximum point of the absolute value of amplitude of the waveform as the result of analysis exists at only one point indicated by (c) in FIG. 1C, and therefore the amount of data among the results of analysis which should be stored is smaller than that of the case using the analyzing filter of the type performing a first order differentiation.

However, where the input signal $f_0(x)$ has a waveform as shown in FIG. 1D, the result of analysis by the analyzing filter of the type performing a first order differentiation for this signal becomes a waveform as shown in FIG. 1E, and the maximum point of absolute value of amplitude of the waveform as the result of analysis exists at two points indicated by (d) and (e) in FIG. 1F.

On the other hand, the result of analysis by the analyzing filter of the type performing a second order differentiation for this signal $f_0(x)$ becomes a waveform as shown in FIG. 1F, the maximum points of absolute value of amplitude of the waveform as the result of analysis become four points indicated by (f) to (i) in FIG. 1F, and the number of maximum value in the case of using the analyzing filter of the type performing a first order differentiation conversely becomes smaller in comparison with the case where the input signal has a waveform as shown in FIG. 1A.

Seeing this from the viewpoints of both the description and storage of the information, the characteristic point of a signal where the input signal $f_0(x)$ has a waveform as shown in FIG. 1A should be given by the value (peak) of the maximum point of the absolute value of amplitude of the filter output signal as shown in FIG. 1C using an analyzing filter of the type performing a second order differentiation.

On the other hand, the characteristic point of a signal where the input signal $f_0(x)$ has a waveform as shown in FIG. 1D should be given by the peak of the filter output signal as shown in FIG. 1E using the analyzing filter of the type performing a first order differentiation.

Where the information is coded by the aforesaid method, when a specific analyzing filter is applied to all of the input signals, the amount of data of the result of analysis does not always become small with respect to the input signal, and there is a problem in that a sufficient compression rate can not be obtained.

Other than the method of compression of the image mentioned above, a large number of image compression methods have been developed, but there is a demand that the image quality and compression rate be further enhanced.

So as to respond to this demand, an attempt has been reported in which consideration is given to the fact that for a two-dimensional image, human vision is sensitive to the edges at which the luminance abruptly changes so that portion of the image is faithfully reproduced.

Also, a dynamic image consists of two-dimensional spatial signals arranged in the time direction, and thus it can be regarded as a three-dimensional spatial image signal. Human vision moves in the time direction in the usual spatial direction with respect to a space-time image, that is, in the direction of successively ordered video image frames and simultaneously performs edge detection.

A particularly sensitive reaction to moving edges is observed in the nerve cells processing the visual information. Accordingly, as with the importance of edge detection of a spatial edge to eyesight, it is also shown that a moving edge is important to eyesight.

Usually, in compression of images using the detection of movement, the movement is detected by a particular method, the time direction is detected using this method, and the error is coded.

However, for a dynamic image, a method of image analysis (compression) and synthesis (reproduction) for faithfully reproducing edge portions in consideration of the fact that vision is sensitive to edges at which luminance (brightness) abruptly changes, such as in the case of a dynamic image, has not yet been reported.

SUMMARY OF THE INVENTION

As mentioned above, the present invention provides an image processing apparatus and method which utilizes the fact that vision is sensitive with respect to the edges at which the luminance abruptly changes in the case of a dynamic image information so as to faithfully reproduce that part.

According to the present invention, there is provided a method of processing a dynamic image comprising the steps of: analyzing a plurality of continuously and successively input two-dimensional image information as three-dimensional image information in each dimension; detecting a characteristic point(s) from the results of said analysis; compressing positional information of said detected characteristic point(s); compressing said results of the analysis at the positions of the characteristic points; and coding said compressed results and said compressed positional information.

Also, according to the present invention, there is provided a method of synthesis of a dynamic image, comprising the steps of:

processing compressed signals obtained by
analyzing a plurality of continuously and successively input two-dimensional image information as three dimensional image information in each dimension,
detecting characteristic points from the results of the analysis,
compressing the positional information of said characteristic points, and
compressing and coding the results of analysis at the positions of said characteristic points;
restoring the positions of the characteristic points;
restoring the results of analysis on said characteristic points; and
restoring the original three-dimensional information from said restored results of analysis.

According to the present invention, there is provided an apparatus for analysis of a dynamic image, comprising: an analysis means for analyzing a plurality of continuously and successively input two-dimensional image information as three-dimensional image information in each dimension, a detecting means for detecting characteristic points from said results of the analysis a compressing means for compressing positional information of said characteristic points, and a compressing and coding means for compressing and coding said results of the analysis at the positions of said characteristic points.

Also, according to the present invention, there is provided an apparatus for synthesis of a dynamic image which processes compressed signals obtained by analyzing a plurality of continuously and successively input two-dimensional information as three-dimensional information in each dimension, detecting the characteristic points from said results of the analysis; compressing the positional information of said characteristic points; and compressing and coding said the results of analysis at the positions of said characteristic points, comprising: a positional information restoring means for restoring the positions of the characteristic points; an analysis result restoring means for restoring the results of analysis on the characteristic points; and an original image restoring means for restoring the original three-dimensional information from the restored results of analysis.

According to the present invention, there is also provided a method of analysis of a signal, including the steps of: performing a plurality of different computations on an object signal to analyze the same, detecting characteristic points in the signal from the results of analysis of said plurality of different computations performed on said object signal, and coding the results of analysis to reduce the amount of data for each characteristic point.

According to the present invention, there is further provided a method of synthesis of a signal, including the steps of: calculating an interpolated signal for each characteristic point based on results of analysis performed by a plurality of different computations on an object signal to be analyzed and on information on the characteristic points of the object signal; calculating an error function at each characteristic point for each point detected in the signal from the results of analysis; renewing the interpolated signal to the next interpolated signal based on the interpolated signal and the error function; and repeating a predetermined number of times the calculation of the interpolated signal, the calculation of the error function, and the renewal of the interpolated signal, inversely computing the computation corresponding to the interpolation function, and to thereby restore the signal before the analysis based on the sum of the results of the inverse computation.

According to the present invention, there is provided an apparatus for analysis of a signal, comprising: a plurality of signal analysis means for performing a plurality of different computations on an object signal which is to be analyzed; a characteristic point detecting means for detecting characteristic points in the signal based on the results of analysis of the signal analysis means; and a coding means for coding the results of analysis of the signal analysis means which outputs the lesser amount of data at each of said characteristic points.

Also, according to the present invention, there is provided an apparatus for synthesis of a signal, comprising: an interpolated signal calculating means for calculating an interpolated signal for each characteristic point based on results of analysis performed by a plurality of different computations on an object signal to be analyzed and information on said characteristic points of said object signal; an error function calculating means for calculating an error function at each characteristic point for each point detected in the signal from the results of analysis; an interpolated signal renewing means for renewing said interpolated signal to the next interpolated signal based on the interpolated signal and the error function; and a signal restoring means for repeating a predetermined number of times the calculation of the interpolated signal, the calculation of the error function, and the renewal of the interpolated signal, inversely computing the computation corresponding to the interpolation function, and to thereby restore the signal before the analysis based on the sum of the results of the inverse computation.

BRIEF DESCRIPTION OF THE DRAWINGS

The above objects and features and other objects and features of the present invention will clear from the following detailed description made with reference to the accompanying drawings, in which:

FIG. 2 is a view showing the structure of an image processing apparatus of the present invention;

FIG. 7 is a view showing the structure of an apparatus for coding information regarded as one-dimensional signals;

DESCRIPTION OF THE PREFERRED EMBODIMENTS

Figure 1A:
FIGS. 1A to 1F are views showing a one-dimensional signal f(x) and the result of analysis by the multiple resolution method thereof.
Figure 1B:
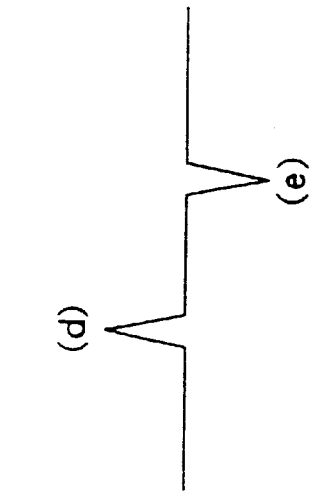
Figure 1C:
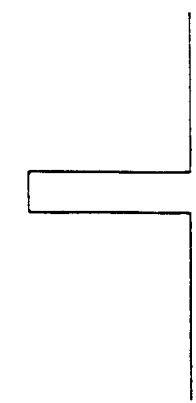
Figure 1D:
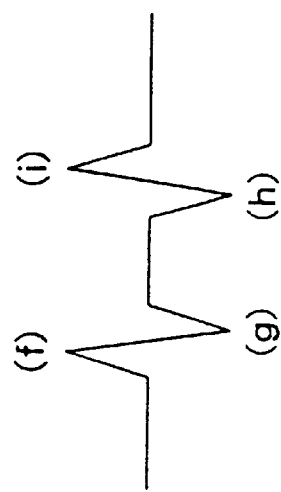
Figure 1E:
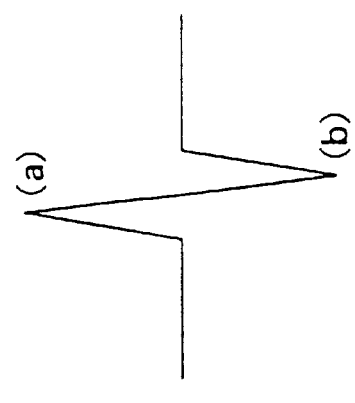
Figure 1F:
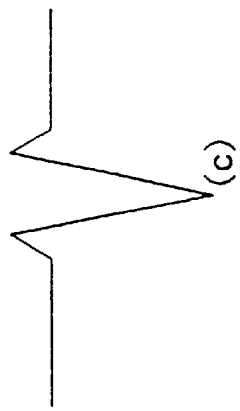

An explanation will be made below of a first embodiment of an image processing apparatus and method according to the present invention.

In the image processing apparatus and method of the present invention, the processing is not carried out by paying attention to only the image information (luminance signal, color difference signal, etc.) in a single image frame of the dynamic image information. The analyzing processing and synthesizing processing of the dynamic image information are carried out by considering the image information as distributed in a three-dimensional space constituted by the two dimensional image plane and the time axis of the successive video image frames of the image frames of the continuous image information.

That is, the change of the image information distributed in the three-dimensional space is analyzed, and the original dynamic image is approximated and restored using the image information at the characteristic points of change obtained by this analysis.

In the first embodiment, the curved surface of the edge of the image information in a three-dimensional space is detected, the image information is analyzed at the points on the curved surface of the edge (edge points), and the results of this analysis are used to interpolate the image information at the points other than those on the curved surface of the edge and thereby synthesize the image information and restore the original image information.

The position information of the edge points of the image is naturally also coded.

The coding (compression) of the position information of the edge points of the image is carried out by expressing the geometric construction, such as the curved surface and curve, by a parametric functional expression and analyzing that function.

An explanation will be made below of the structure of an image processing apparatus 1 of the present invention referring to FIG. 2.

Note that, in the first embodiment, for convenience of the explanation, a case where the coding is carried out for the F (F is an integer) frames worth of black and white dynamic image information will be described.

FIG. 2 is a view showing the structure of the image processing apparatus 1.

In FIG. 2, a dynamic image memory 11 is formed by a frame memory for recording F frames worth of information (data) of a black and white dynamic image (below, simply described as a dynamic image).

An information change analysis unit 12 performs the three-dimensional analysis of the change of luminance (brightness) in the dynamic image information stored in the dynamic image memory 11 and inputs the results of that analysis to a characteristic point detection unit 13.

A characteristic point detection unit 13 processes the results of analysis input from the information change analysis unit 12, analyzes it, expresses the locations at which the characteristic points exist in the three-dimensional space as points, and inputs the results to the characteristic point coding unit 14 and the information coding unit 15.

A characteristic point coding unit 14 further processes the results of analysis of the characteristic point detection unit 13 and expresses the locations at which the characteristic points exist as a curved surface.

An information coding unit 15 executes analysis for obtaining the information necessary for reproducing the input dynamic image at the above-mentioned characteristic points and inputs the results of that analysis to the general coding unit 16.

A total coding unit 16 codes the output information of the characteristic point coding unit 14 and the information coding unit 15.

The above units constitute the dynamic image analysis apparatus 10 of the present invention.

The above units can be constituted by independent hardware or constituted in the form of software in the same computer.

A total reproduction unit 21 decodes the information coded at the comprehensive coding unit 16 to reproduce the output information of the characteristic point coding unit 14 and the information coding unit 15.

The information reproduction unit 22 selects the characteristic points in the three-dimensional space based on the information concerning the positions of the characteristic points reproduced at the total reproduction unit 21, arranges the output information of the information coding unit 15 at those positions, and inputs the same to the original image reproduction unit 23.

By also interpolating the image component at the locations other than the characteristic points, the part of the original dynamic image at which the change in luminance change was vigorous (in three-dimensional space), which is visually important, is faithfully approximated and the other parts are smoothly approximated.

The original image reproduction unit 23 synthesizes and reproduces the original dynamic image by the convex projection method based on the reproduced information of the information reproduction unit 22.

The parts from the total reproduction unit 21 to the original image reproduction unit 23 described above constitute the dynamic image synthesis apparatus 20 of the present invention.

A detailed explanation will be given below for the operation of each part of the image processing apparatus 1.

The dynamic image memory 11 stores in its memory F frames worth of image information from an image signal output apparatus such as a camera or video.

This image information features correspondence with the position (coordinates x and y) on the image frame and time (frame t in which that information exists) and therefore is expressed as $I_0(x,y,t)$.

That is, this image information (data) $I_0(x,y,t)$ can be considered to be information distributed in a three-dimensional space comprising an image plane and time axis.

This data is accessed as the original image data from the information change analysis unit 12 for the processing.

The information change analysis unit 12 analyzes the three-dimensional change of the original image stored in the dynamic image memory 11.

More specifically, the information change analysis unit 12 performs filtering processing with orientation in respective directions in multiple resolution. This multiple resolution is performed with a scale $\sigma_j$ up to when j becomes equal to j1, ..., jJ.

First, the DC component is independently analyzed.

This DC component is sent to the total coding unit 16 where it is coded, then is restored at the dynamic image synthesis apparatus 20, and added again to the synthesized image signal.

This analysis corresponds to the filtering by a function $G(x,y,t; \sigma_{j,J})$ corresponding to the characteristic (j=jJ) of the filter having the roughest resolution when making a window function or smoothing function as the function $G(x,y,t: \sigma_j)$. Thus, this filtering is expressed by the following equation:

$$S_{j,J}(x,y,t) = G(x,y,t;\sigma_{j,J})***I_0(x,y,t) \tag{14}$$

where, the symbol *** in the equation expresses three-dimensional convolution computation.

A signal from which this component is subtracted is expressed by the following equation:

$$I(x,y,t) = I_0(x,y,t) - S_{j,J}(x,y,t) \tag{15}$$

The information change analysis unit 12 analyzes the change of the dynamic image by using this signal.

First, the convolution computation is performed for the image signal $I_0(x,y,t)$ by an analyzing filter having a characteristic defined by the following equations:

$$G_x(x, y, t; \sigma_j) = \frac{\partial}{\partial x} G(x, y, t; \sigma_j) \tag{16}$$

$$G_y(x, y, t; \sigma_j) = \frac{\partial}{\partial y} G(x, y, t; \sigma_j) \tag{17}$$

$$G_t(x, y, t; \sigma_j) = \frac{\partial}{\partial t} G(x, y, t; \sigma_j) \tag{18}$$

Thus, the results of the convolution computation are expressed by the following equations:

$$W_x I(x,y,t;\sigma_j) = G_x(x,y,t;\sigma_j)***I(x,y,t) \tag{19}$$

$$W_y I(x,y,t;\sigma_j) = G_y(x,y,t;\sigma_j)***I(x,y,t) \tag{20}$$

$$W_t I(x,y,t;\sigma_j) = G_t(x,y,t;\sigma_j)***I(x,y,t) \tag{21}$$

The characteristic point detection unit 13 finds the locations of the maximum value and minimum value (extrema values) of the results of analysis of the information change analysis unit 12.

More specifically, the characteristic point detection unit 13 differentiates the results of equations 19, 20, and 21 in the same direction again, finds the points at which the values become 0 (zero cross points), thereby finding the positions of the image data forming the extrema values in the three-dimensional space.

In other words, this processing finds the zero cross points of the output of an analyzing filter of a type performing a second order differentiation in each axial direction regarding the results of analysis of the information change analysis unit 12.

Therefore, the characteristic of an analyzing filter of a type performing a second differentiation is defined by the following equations:

$$G_{xx}(x, y, t; \sigma_j) = \frac{\partial^2}{\partial x^2} G(x, y, t; \sigma_j) \tag{22}$$

$$G_{yy}(x, t, t; \sigma_j) = \frac{\partial^2}{\partial y^2} G(x, y, t; \sigma_j) \tag{23}$$

$$G_{tt}(x, y, t; \sigma_j) = \frac{\partial^2}{\partial t^2} G(x, y, t; \sigma_j) \tag{24}$$

By an analyzing filter having the above-described characteristic, the characteristic point detection unit 13 filters the image signal $I_0(x,y,t)$ and finds the respective zero cross points.

That is, the computation expressed by the following equations is carried out.

$$W_{xx} I(x,y,t;\sigma_j) = G_{xx}(x,y,t;\sigma_j)***I(x,y,t) \tag{25}$$

$$W_{yy} I(x,y,t;\sigma_j) = G_{yy}(x,y,t;\sigma_j)***I(x,y,t) \tag{26}$$

$$W_{tt} I(x,y,t;\sigma_j) = G_{tt}(x,y,t;\sigma_j)***I(x,y,t) \tag{27}$$

The zero cross point obtained by the above computation when the filter output $W_{xx}I(x,y,t: \sigma_j)$ becomes equal to zero is expressed as $P_{xi}(xxi,yxi,txi: \sigma_j)$.

Note, it is assumed that jNx number of zero cross points exist when $j=1, \ldots, jNn$.

Similarly, the zero cross point giving the filter output $W_{yy}I(x, y, t: \sigma_j)=0$ is expressed as $P_{yh}(xyh,yyh,tyh: \sigma_j)$.

Note, it is assumed that jNy number of zero cross points exist when $h=1, 2, 3, \ldots, jNy$.

Also, similarly, the zero cross point giving the filter output $W_{tt}(x,y,t: \sigma_j)=0$ is expressed as $P_{tk}(xth,yth,tth: \sigma_j)$.

Note, it is assumed that jNt number of zero cross points exist when $k=1, 2, \ldots, jNt$.

Below, for simplication of the notation, the zero cross point $P_{xi}(xxi,yxi,txi: \sigma_j)$ is expressed as $P_{xi}(j)$.

Similarly, the zero cross point $P_{yh}(xyh,yyh,tyh: \sigma_j)$ is expressed as $P_{yh}(j)$.

Also, similarly, the zero cross point $P_{tk}(xth,yth,tth: \sigma_j)$ is expressed as $P_{tk}(j)$.

The characteristic point coding unit 14 detects the zero cross point $P_{xi}(j)$, zero cross point $P_{yh}(j)$, and the zero cross point $P_{tk}(j)$ obtained at the characteristic point detection unit 13 as points on a curved surface, points on a curve, or isolated points, respectively.

The characteristic point coding unit 14 performs the coding by expressing the zero cross point $P_{xi}(j)$, zero cross point $P_{hy}(j)$, and the zero cross point $P_{tk}(j)$ by the parameters of these curved surfaces, curves, and isolated points.

First, where there exists a point at which the zero cross point $P_{xi}(j)$, the zero cross point $P_{yh}(j)$, and the zero cross point $P_{tk}(j)$ overlap, the characteristic point coding unit 14 forms a characteristic point set (aggregate) P(j) by combining them into one.

Therefore, the characteristic point set P(j) consists of the points in the three-dimensional space which are values expressed by the filter output $W_{xx}(x,y,t: \sigma_j)=0$ or filter output $W_{yy}(x,y,t: \sigma_j)=0$, or filter output $W_{tt}(x,y,t: \sigma_j)=0$.

The elements of the characteristic point set P(j) are expressed as the characteristic point $P_p(j)$.

Note, the suffix of the characteristic point $P_p$ which is the element of the characteristic point set P(j) expresses $p=1, 2, \ldots, N_p$, and has $N_p$ number of characteristic points in total.

Next, the characteristic point coding unit 14 forms several groups by linking the characteristic points in the three-dimensional space.

Here, the term "link" means that a certain characteristic point $P_p(j)$ is noted, the processing is carried out for a cube constituted by, for example (3×3×3) pixels using the pixel of $P_p(j)$ as the center, and any characteristic points which are similarly elements of the characteristic point set P(j) and are contained in this are regarded as belonging to the same group.

The element of this group can be expressed as a two-dimensional curved surface, one-dimensional curve, or points in the three-dimensional space.

Note, there also exists a case where they are mutually joined.

The characteristic point coding unit 14 divides these groups into groups each constituted only by elements of points, elements of curves, or elements of curved surfaces, respectively.

Below, a description will be made of a case where groups of $gj=1, 2, \ldots, M_j$ are formed in the scale $\sigma_j$ in this way.

In the $g_j$-th group $P_{gj}(j)$, it is assumed that the number of elements is Q(gj).

For convenience of the explanation, a group consisting of only isolated points is expressed as $gj=1, \ldots, M0_j$.

Also, a group consisting of only a curve is expressed as $gj=M0_{j+1}, \ldots, M0_j+M1_j$.

Also, a group consisting of only a curved surface is expressed as $gj=K0_j+M1_{j+1}, \ldots, M0_j+M1_j+M2_j$.

The above symbols will be explained below:

Below, the number of elements of a certain set (aggregate) P is expressed as |P|.

The characteristic point set P(j) is a set using the characteristic point $P_p(j)$ in the scale $\sigma_j$ as an element, and $|P(j)|=N_p$.

A partial set $P_{gj}(j)$ is the gj-th partial set in the scale $\sigma_j$, and $|P_{gj}(j)|=Q(gj)$.

Among the partial sets $P_{pj}(j)$, gj=1, . . . , $M0_j$ is a set having isolated points as elements.

Among the partial sets $P_{gj}(j)$, gj=$M0_j$+1, . . . , $M0_j$+$M1_j$ is the set having characteristic points constituting a curve as elements.

Among the partial sets $P_{gj}(j)$, gj=$M0_j$+$M1_{j+1}$, . . . , $M0_j$+$M1_j$+$M2_j$ is a set having characteristic points constituting a curved surface as elements.

Also, the following symbols are further defined.

The characteristic points which are the elements of the partial set $P_{gj}(j)$ are expressed as the characteristic points $P_{gj}(j)q$.

Note, q=1, 2, . . . , Q(gj).

The characteristic point $P_{gj}(j)q$ is a point of a three-dimensional space, and therefore it has three values for its position information of (x,y,t).

These three values of the characteristic points are expressed as {$P_{gj}(j)(xq)$, $P_{gj}(j)(yq)$ and $P_{gj}(j)(tq)$}.

The order of q described above is assumed to be such that q=1 is the start point and the points are arranged in an order linking the points on the curve when they are elements of a partial set $P_{gj}(j)$ belonging to a curve.

Elements of the partial set $P_{gj}(j)$ belonging to a curved surface will be explained later.

Various methods of expressing these elements compactly can be considered. The following method is used here.

The group gj=1, . . . , $M0_j$ consisting of only the isolated points has three dimensional positions as data.

Figure 3:
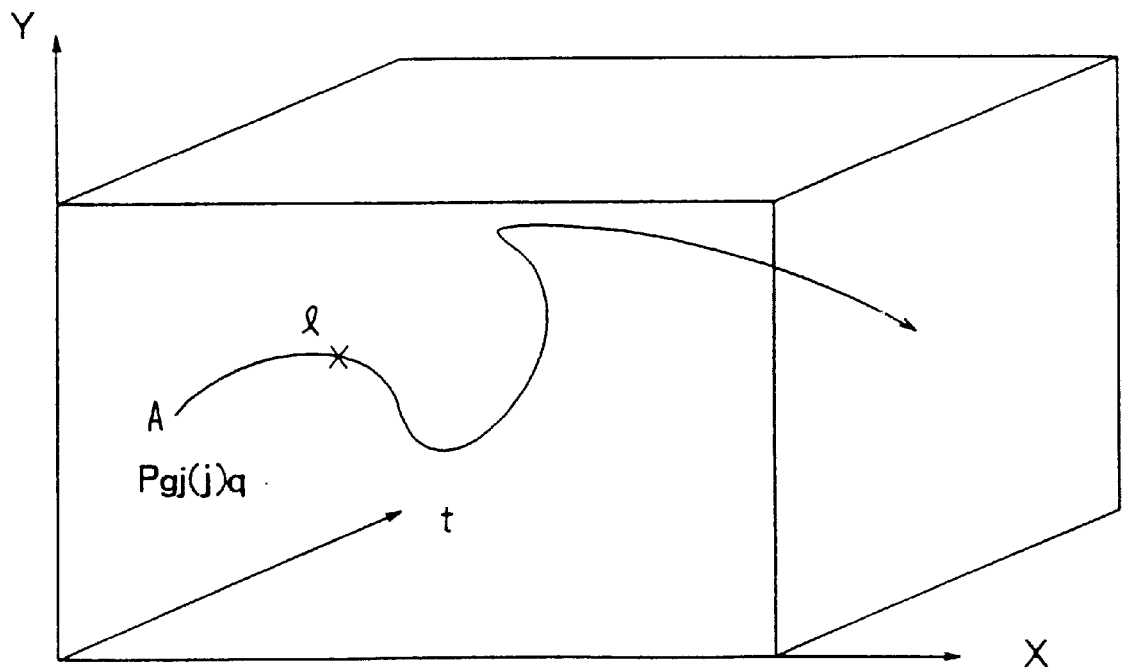
FIG. 3 is a view showing one example of a curve in a three-dimensional space.

FIG. 3 is a view showing one example of a curve in a three-dimensional space.

Figure 4A:
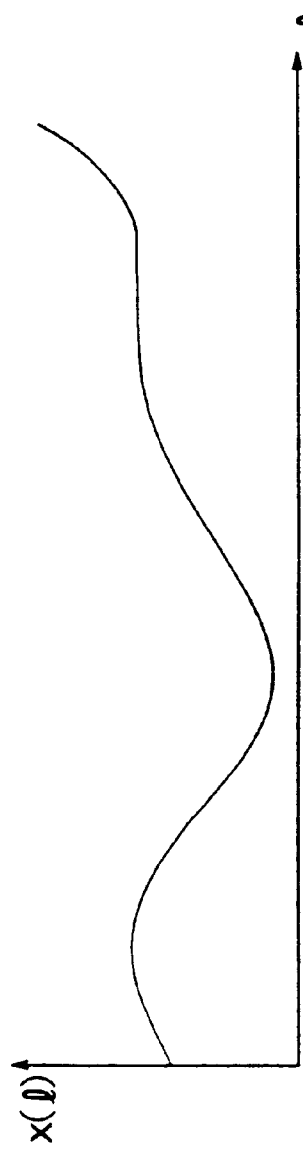
FIGS. 4A to 4C are views of the curve in the three-dimensional space shown in FIG. 3 graphed using the length from the start point as a parameter.
Figure 4B:
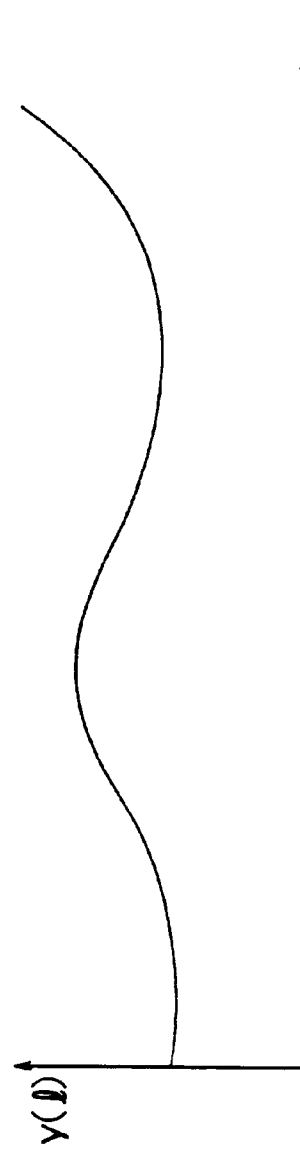
Figure 4C:
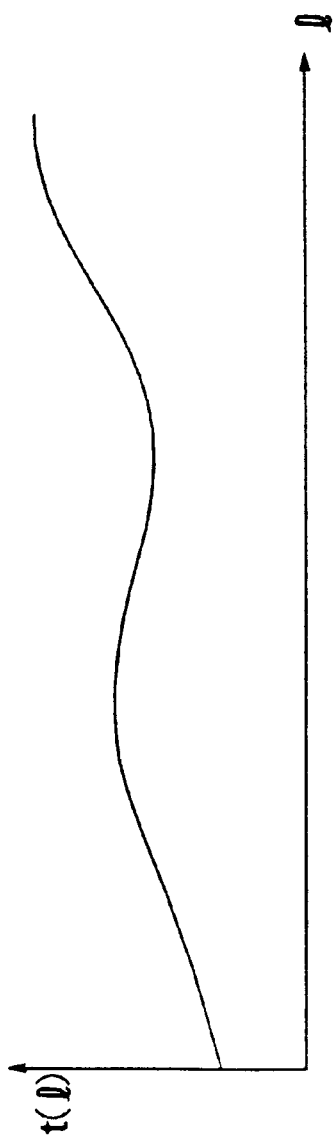

FIGS. 4A to 4C are views representing as graphs the curve in the three-dimensional space shown in FIG. 3 using the length from the start point A as the parameter.

The group gj=$M0_{j+1}$, . . . , $M0_j$+$M1_j$ consisting of the curve is expressed in the graph so that [x(l),y(l),t(l)] are indicated in FIGS. 4A, 4B, and 4C, respectively, by using the length l from the start point as the parameter. These three lines are expressed using the method of the synthesis of the results of analysis of the multiple resolution and the interpolation from the extrema values thereof.

Therefore, the data which is necessary is specific points obtained from that analysis.

The data necessary for the above two cases are explained below.

In the case of isolated points, the characteristic point coding unit 14 codes the points in a three-dimensional space {$P_{gj}(x1)$, $P_{gj}(y1)$, and $P_{gj}(t1)$}.

In the case of a curve, the characteristic point coding unit 14 codes the following points:

(1) Start points ($P_{gj}(x1)$, $P_{gj}(y1)$, $P_{gj}(t1)$)

(2) End points {$P_{gj}(xQ(gj))$, $P_{gj}(yQ(gj))$, $P_{gj}(tQ(gj))$}.

In a case where the graph of the parameter x(l) is defined as $P_{gj}(j)(x)=fx(l)$:

(3) Positions $l_{nx}$ of specific points of f(x)

(4) Values $fx(l_{nx})$ at the positions $l_{nx}$ of specific points of x.

In the case where the graph of the parameter y(l) is expressed as $P_{gj}(j)(y)=fy(l)$:

(5) Positions $l_{ny}$ of y specific points (6) Values $fy(l_{ny})$ at the positions $l_{ny}$ of the y specific points.

In the case where the graph of the parameter t(l) is expressed as $P_{gj}(j)(t)=ft(l)$:

(7) Positions $l_{nt}$ of t specific points (8) Values $ft(l_{nt})$ at the positions $l_{nt}$ of the t specific points.

The above are coded.

Figure 5:
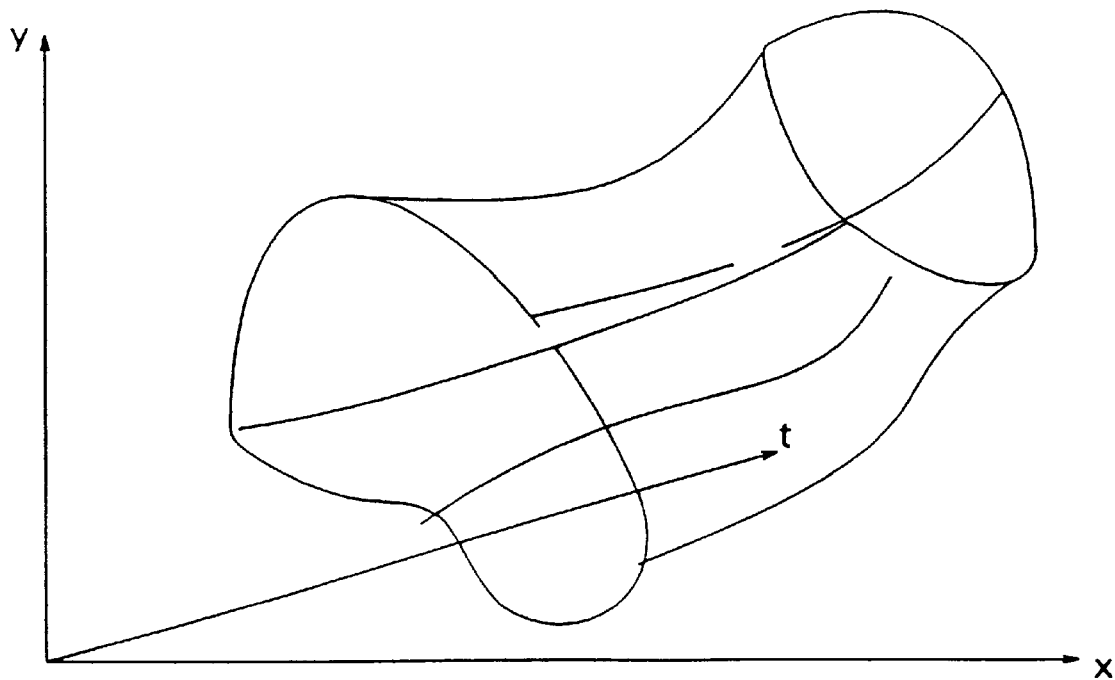
FIG. 5 is a view showing an example of a curved surface in a three-dimensional space.

FIG. 5 is a view showing one example of a curved surface in a three-dimensional space.

Figures 6A, 6B:
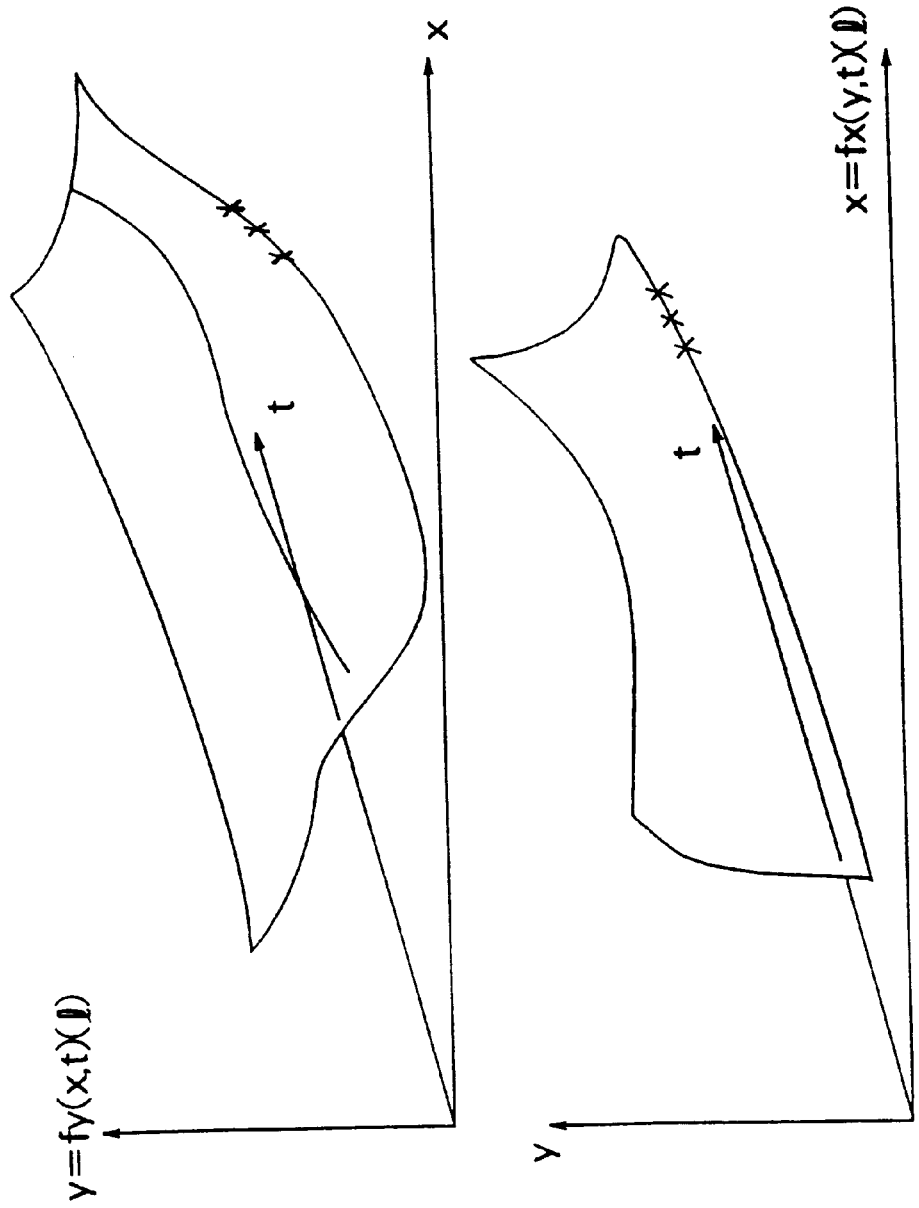
FIGS. 6A and 6B are views explaining the processing for the curved surface shown in FIG. 5.

FIGS. 6A and 6B are views explaining the processing for the curved surface shown in FIG. 5.

In the case of the group gj=$M0_j$+$M1_{j+1}$, . . . , $M0_j$+$M1_j$+$M2_j$ consisting of the curved surface, a compression technique the same as that for a two-dimensional static image data is used by further dividing the elements of one group to single-valued functions y=f1(x,t) and x=f2(y,t), which is the distance from a x-t plane and y-t plane, respectively.

Note, since the original curved surface can not be expressed by a single-valued function as described above, some manipulation is necessary.

Therefore, in the first embodiment, as shown in FIG. 6A, the characteristic point coding unit 14 constitutes the curved surface expressed in y=fy(x,t) (l) by the point having the smallest y component at the coordinate (x,t).

The point used here is excluded from the original set.

Also, as shown in FIG. 6B, the characteristic point coding unit 14 constitutes the curved surface expressed in x=fx(y,t) (l) by the point having the smallest x component in the coordinate (y,t). The point used there is excluded from the original set. This processing is sequentially repeated, thereby expressing all points.

In this way, the elements of $P_{gj}(j)$ constituting one curved surface constitute several curved surfaces y=fy(x,t) (kk) and x=fx(y,t) (kk).

Note, it is defined that kk=1, 2, . . . , kk(gj).

Each and every one of these curved surfaces can be considered to be the same as a static image, and therefore compression processing the same as that for a static image can be carried out for this information.

The method of this compression processing will be described later.

The data necessary for constituting a start point and curved surface is obtained by this compression processing.

The information coding unit 15 analyzes the information on the curved surface, curve, or isolated points constituted by the aforementioned characteristic points and performs the compression.

The compression is performed for the following reason.

Namely, this is because these characteristic points are points giving the extrema values of information analyzed at the information change analysis unit 12, and the extrema values thereof change only smoothly on the linked characteristic points.

Concretely, the characteristic point coding unit 14 divides the aforementioned partial signal $P_{gj}(j)$ into isolated points, curves, and curved surfaces. The positions (x,y,t) thereof are coded at the characteristic point coding unit using the partial sets, but the information coding unit 15 codes the analysis result $W_xI(x,y,t: \sigma_j)$, analysis result $W_yI(x,y,t: \sigma_j)$, and the analysis result $W_yI(x,y,t: \sigma_j)$ by the same procedure.

First, for isolated points, the information coding unit 15 uses the analysis result $W_xI(x,y,t: \sigma_j)$, analysis result $W_yI(x,y,t: \sigma_j)$, and the analysis result $W_tI(x,y,t: \sigma_j)$ there as information.

Also, for a curve, the information coding unit 15 takes the length l from the start point as the parameter, considers the graphs of the analysis result $W_xI(x,y,t: \sigma_j)$, analysis result $W_yI(x,y,t: \sigma_j)$, and the analysis result $W_tI(x,y,t: \sigma_j)$, and performs the compression of these three functions.

In the same way as the aforementioned characteristic point coding, the analysis of the multiple resolution and the compression by the extrema values thereof are one example.

Also, for the compression of the information of points on a curved surface, the method of division expressed as the function of distance from the x-t plane and y-t plane used at the analysis of the characteristic points can be used.

Thus, the information coding unit 15 can perform the compression by treating the analysis result $W_xI(x,y,t: \sigma_j)$, analysis result $W_yI(x,y,t: \sigma_j)$, and the analysis result $W_tI(x,y,t: \sigma_j)$ at a point expressed as $y=f1(x,t)$ as three single-valued functions of $(x,t)$.

Accordingly, the compression of information of points on the curved surface can be achieved by treating the curved surface as three planes and performing the compression of the two-dimensional images for these three planes.

For example, the analysis of multiple resolution and the compression using the interpolation from the extrema values thereof can be considered.

As in the above, the information coding unit 15 performs the compression of the results of analysis on the characteristic points.

The total coding unit 16 codes the output data of the characteristic point coding unit 14 and the information coding unit 15.

The total coding unit 16 compresses the degree of redundancy of the output data of the characteristic point coding unit 14 and the information coding unit 15 by, for example, run-length coding, and performs the bit allocation for the quantization, etc.

Also, if necessary, it performs the coding for the error correction.

The results thereof are transmitted and recorded.

The total reproduction unit 21 performs a reverse operation to that of the total coding unit 16 for the data which is input.

Accordingly, it returns the signal coded at the total coding unit 16 to the output data of the characteristic point coding unit 14 and the information coding unit 15.

The information reproduction unit 22 restores the positions of the characteristic points from data equivalent to the output of the characteristic point coding unit 14 obtained by the total reproduction unit 21 and restores the position of all characteristic points in the three-dimensional space of x-y-t and the information at those positions from data equivalent to the output of the information coding unit 15.

Therefore, the information reproduction unit 22 performs a reverse processing to the compression performed by the characteristic point coding unit 14 and the information coding unit 15 on the original image information.

The information of the isolated points is exactly the same as the positional information in the three-dimensional space.

Accordingly, the positions of isolated points can be immediately designated by the information of the isolated points.

Next, among the information of a curve, the information of the start point is the same as that of an isolated point and expresses the position of the start point of the curve as it is. Accordingly, the position of the start point can be immediately designated by the information of the start point.

Also, the information of the other parts of the curve are compressed by defining three graphs of $x(l)$, $y(l)$, and $t(l)$ as functions of the length "l" as in FIGS. 4A to 4C, and viewing each of them as a one-dimensional signal; therefore the information reproduction unit 22 performs the reverse processing to this.

In this example, the multiple resolution is analyzed and the extrema values thereof are coded, and therefore it is possible to reproduce the original one-dimensional graphs from these extrema values.

This can be executed by a method using the interpolation and convex projection method.

In addition, the results of the information change analysis unit 12 on these characteristic points are coded as functions having the same length "l", and therefore these are restored in the same way as with the characteristic points.

From these results, the information reproduction unit 22 can restore the positions of the characteristic points divided into groups as curves and the values of the information change analysis unit 12 thereat in the three-dimensional space.

Finally, the information reproduction unit 22 restores the characteristic points divided into groups as the curved surfaces and the results of the information change analysis unit 12 on this.

The positions of the characteristic points are expressed as the distances from the x-t plane, and the positional information of this has been compressed.

The information reproduction unit 22 expresses the positions of the characteristic points as a graph of the distance from the original x-t plane from this compression data.

On the other hand, with the use of the same parameter x-t, the results of the information change analysis unit 12 is regarded as three sets of two-dimensional data, and the two-dimensional data are compressed. The information reproduction unit 22 returns also these compressed data to the original three graphs.

By the above processing, the information reproduction unit 22 can restore the positions of the characteristic points expressed by the graphs and the results of the information change analysis unit 12 on this.

As repeated at the time of coding, as the graph expression using x-t and y-t as the parameters, the positions of the characteristic points divided into groups as all curved surfaces in the three-dimensional space and the results of the information change unit on the characteristic points can be restored.

By the above procedure, the information reproduction unit 22 restores all of the positions of characteristic points of x-y-t in the three-dimensional space and the results of analysis of the information change analysis unit 12 at those positions.

On the basis of the information of the extrema values of the results of analysis of the information change analysis unit 12 obtained by the processing mentioned above, the original image reproduction unit 23 interpolates the same, restores the results of the information change analysis unit 12 in the entire three-dimensional space of x-y-t, performs a reverse transformation of equations 19, 20, and 21 for them, and restores the original three-dimensional data of x-y-t.

Here, the interpolation and inverse transformation are repeated several times using a convex projection method, and the results are contracted.

A method of this interpolation and inverse transformation will be mentioned later.

First, for the convenience of explanation, a description will be made of the case where the interpolation from the characteristic points is independently carried out with respect to the directions (x,y,t).

That is, the original image reproduction unit 23 regards all y and all t in the x-direction as yt lines of one-dimensional data in total and uses the analysis results $W_xI(x,y,t: \sigma_j)$ at the extrema values to obtain, by the method as will be mentioned later, projections that use the points thereof as the extrema values.

The original image reproduction unit 23 similarly makes projections for the y-direction and t-direction.

The original image reproduction unit 23 performs the inverse transformation for the obtained approximated data by the method defined in equation 32 and forms the projection again in the original analysis space by the method defined by equations 19, 20, and 21.

The original image reproduction unit 23 repeats this procedure several times and contracts this to the analysis result $W_xI(x,y,t: \sigma_j)$, analysis result $W_yI(x,y,t: \sigma_j)$, and the analysis result $W_tI(x,y,t: \sigma_j)$. Finally, the original image reproduction unit 23 performs the inverse transformation and restores the image signal $I(x,y,t)$. it is sufficient for the inverse transformation if the next filter is convoluted into the analysis result.

$$'G_x^*(u,v,w;\sigma_j) = \overline{'G_x}(u,v,w;\sigma_j)/C(u,v,w) \quad (28)$$

$$'G_y^*(u,v,w;\sigma_j) = \overline{'G_y}(u,v,w;\sigma_j)/C(u,v,w) \quad (29)$$

$$'G_t^*(u,v,w;\sigma_j) = \overline{'G_t}(u,v,w;\sigma_j)/C(u,v,w) \quad (30)$$

Note, the following stands:

$$C(u, v, w) = \sum_{j=j1}^{jJ} [\|'G_x^*(u,v,w;\sigma_j)\|^2 + \|'G_y^*(u,v,w;\sigma_j)\|^2 + \|'G_t^*(u,v,w;\sigma_j)\|^2] \quad (31)$$

Here, $'G_x(u,v,w: \sigma_j)$, $'G_y(u,v,w: \sigma_j)$, and $'G_t(u,v,w:\sigma_j)$ in the equations respectively express Fourier transformations of $G_x(x,y,t: \sigma_j)$, $G_y(x,y,t: \sigma_j)$, and $G_t(x,y,t:\sigma_j)$, and the lines attached above the symbols in the equation express a complex conjugate.

Also, $'G_x^*(u,v,w: \sigma_j)$, $'G_y^*(u,v,w: \sigma_j)$, and $'G_t^*(u,v,w: \sigma_j)$ in the equations respectively express the Fourier transformations of $G_x^*(x,y,t: \sigma_j)$, $G_y^*(x,y,t: \sigma_j)$, and $G_t^*(x,y,t: \sigma_j)$.

The signal $I(x,y,t)$ is found by the following equation using a filter of the inverse transformation defined by the following equation:

$$I(x, y, t) = \sum_{j=j1}^{jJ} [G_x^*(x, y, t; \sigma_j) *** W_xI(x, y, t; \sigma_j) + G_y^*(x, y, t; \sigma_j) *** W_yI(x, y, t; \sigma_j) + G_t^*(x, y, t; \sigma_j) *** W_tI(x, y, t; \sigma_j)] \quad (32)$$

Finally, the original image reproduction unit 23 obtains the original dynamic image signal $I_0(x,y,t)$ by adding the DC component.

$$I_0(x,y,t) = I(x,y,t) + S_{jJ}(s,y,t) \quad (33)$$

In this way, the original image information $I_0(x,y,t)$ can be restored.

Below, an explanation will be made of an example of a method of compressing the signal of one dimension as in the case where the characteristic points in the information coding unit 15 constitute a curve and a method of the interpolation of a one-dimensional signal in the information reproduction unit 22 and the inverse transformation. Here, an explanation will be made of a case where a one-dimensional signal which is simple is made the object of the processing for the convenience of explanation, but it is also possible to apply the present invention also to a signal of two or more dimensions.

Below, the one-dimensional signal used as the object is defined as $f_0(x)$.

FIG. 7 is a view showing the structure of the apparatus for coding the information regarded as a one-dimensional signal.

In FIG. 7, the low frequency detection circuit 51 performs the convolution computation for filtering the signal $S_{jJ}(x)$ of the low frequency component of the signal $I_0(x)$ which was input.

A first order differentiation type analyzing circuit 52 receives as its input the signal $f(x)\{f(x)=f_0(x)-S_{jJ}(x)\}$ which is the result of subtraction of the low frequency component signal $S_{jJ}(x)$ extracted at the low frequency detection circuit 51 from the original signal $f_0(x)$ at the subtraction circuit 55, and performs the analysis of multiple resolution of the type performing a first order differentiation for this input signal (a first order differentiation type).

Note, the suffix jJ is an index showing the largest scale of the multiple resolution mentioned later.

A second differentiation type analyzing circuit 53 receives as its input the above-described signal $f(x)$ and performs the analysis of the multiple resolution of the type of performing a second order differentiation for this input signal (a second order differentiation type).

The characteristic point detection unit 54 determines the characteristic (important) points jXn thereof using the output signals $G1_jf(x)$ of the first order differentiation type analyzing circuit 52 and the output signal $G2_jf(x)$ of the second order differentiation type analyzing circuit 53.

Note, here, j=j1, ..., jJ is the "j" of the scale 2j of the multiple resolution, and n=1, 2, 3, ..., are indexes arranging the important points in the order from the smallest one.

The subtraction circuit 55 subtracts the signal input from the signal indicated by (−) from the signal input from the input indicated by (+) in the diagram by digital computation.

Note that, it is also possible to constitute the same so that the compression is carried out also for the output data of the subtraction circuit 55, and the data after this compression is expanded at the information reproduction unit 22 side and input to the adder circuit 65.

Figure 8:
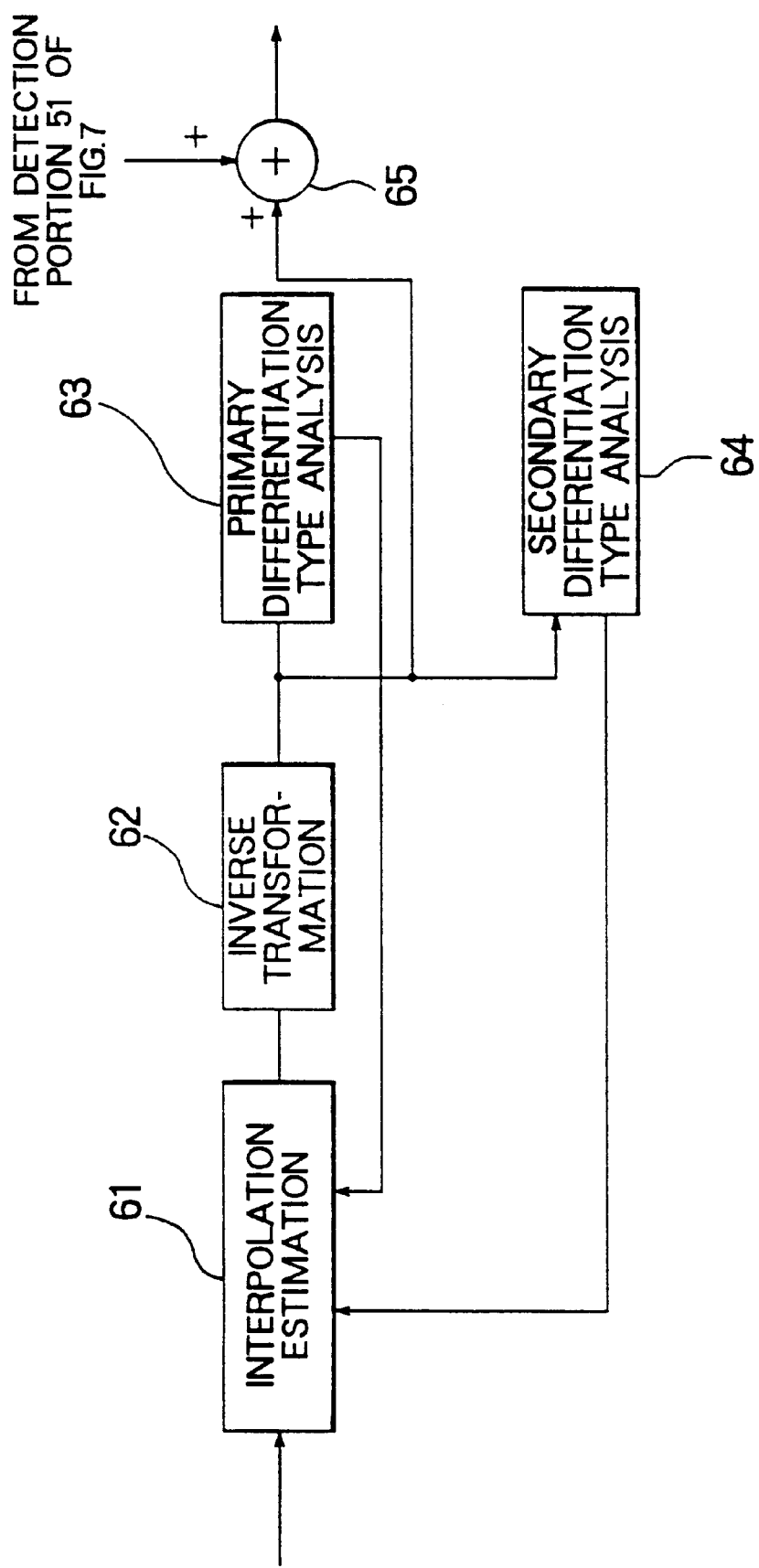
FIG. 8 is a view showing the structure of an apparatus for synthesizing an original one-dimensional signal from a signal obtained by coding the information regarded as a one-dimensional signal.

FIG. 8 is a view showing the structure of an apparatus for synthesizing a one-dimensional signal from a signal obtained by coding the information regarded as one-dimensional signal.

In FIG. 8, the interpolation estimation unit 61 performs interpolation estimation for the signal $G1_jf(x)$ and the signal $G2_jf(x)$ from the coded data.

The inverse transformation unit 62 inversely transforms the original signal $f(x)$ to the restored signal $'f(x)$ using the interpolation data $'G1_jf(x)$ and $'G2_jf(x)$ of the signal $G1_jf(x)$ and the signal $G2_jf(x)$.

The first order differentiation type analyzing circuit 63 is a local encoder for finding the interpolation data $'G1_jf(x)$ using the repeated calculation.

The second order differentiation type analyzing circuit 64 is a local encoder for finding the interpolation data $'G2_jf(x)$ using the repeated calculation.

The adder circuit 65 adds the input two signals by digital computation.

The outputs of the first order differentiation type analyzing circuit 63 and the second order differentiation type analyzing circuit 64 are returned to the interpolation estimation unit 61 as the signal $\{G1_jf(x)\}$ and signal $\{G2_jf(x)\}$, respectively.

After this computation is repeated several times, the $'f(x)$ is finally found.

Finally, the output signal $S_{jJ}(x)$ of the low frequency detection circuit 51 is added to this final $'f(x)$, and the restored signal $'f_0(x)$ of $f_0(x)$ is output.

Below, an explanation will be made of the operation of the apparatus for coding the information regarded as a one-dimensional signal.

The low frequency detection circuit 51 extracts the low frequency component of the input signal $f_0(x)$ and inputs the signal $S_{j,J}(x)$ to the subtraction circuit 55 and the adder circuit 65.

Here, in the low frequency detection circuit 51, the convolution computation of the smoothing filter of the same type as the filter having the roughest resolution among the filters used for the signal analysis by the multiple resolution method is carried out, and the low frequency component $S_{j,J}(x)$ is detected. Concretely, the smoothing function is made a Gaussian type function $G0_{j,J}(x)$.

Specifically, this function $G0_{j,J}(x)$ is expressed by the following equation:

$$G0_{j,J}(x) = \frac{1}{\sqrt{2\pi}\,\sigma_{j,J}} \exp\left[-\frac{x^2}{2\sigma_{j,J}^2}\right] \tag{34}$$

Also, here, if it is assumed that $\{\sigma_{j,J}=2_{j,J}\}$, the low frequency component $S_{j,J}(x)$ is expressed by the following equation:

$$S_{j,J}=G0_{j,J}(x)*f(x) \tag{35}$$

In the above equations, the symbol * attached in the numerical equations indicate a convolution.

The subtraction circuit 55 subtracts the signal $S_{j,J}(x)$ from the signal $f_0(x)$ and inputs the same as the signal $f(x)$ to the first order differentiation type analyzing circuit 52 and the second order differentiation type analyzing circuit 53.

Below, an explanation will be made of the operation of the first order differentiation type analyzing circuit 52.

In the first order differentiation type analyzing circuit 52, a digital computation is carried out for the input signal $f(x)$, and the analysis of the multiple resolution using the first order differentiation type analyzing filter $G1_j(x)$ is carried out.

Here, the characteristic of the analyzing filter $G1_j(x)$ is expressed by the equation:

$$G1_j(x) = \frac{-x}{\sigma_j\sqrt[3]{2\pi}} \exp\left[-\frac{x^2}{2\sigma_j^2}\right] \tag{36}$$

The computation of equation 37 is carried out using this analyzing filter $G1_j(x)$.

$$G1_j f(x)=G1_j(x)*f(x) \tag{37}$$

Note that the computation of equation 37 is carried out for the respective resolutions j=j1, . . . , jJ.

An explanation will be made below of the operation of the second order differentiation type analyzing circuit 53.

In the second order differentiation type analyzing circuit 53, the digital computation is carried out for the input signal $f(x)$, and the analysis of the multiple resolution using the second order differentiation type analyzing filter $G2_j(x)$ is carried out.

Here, the characteristic of the analyzing filter $G2_j(x)$ is expressed by the equation:

$$G2_j(x) = \frac{-1}{\sigma_j\sqrt[3]{2\pi}}\left[1-\frac{x^2}{\sigma_j^2}\right]\exp\left[-\frac{x^2}{2\sigma_j^2}\right] \tag{38}$$

The computation of the equation 39 is carried out using this analyzing filter $G2_j(x)$.

$$G2_j f(x)=G2_j(x)*f(x) \tag{39}$$

Note, the computation of equation 39 is carried out for the respective resolutions j=j1, . . . , jJ.

The characteristic point detection unit 54 finds characteristic (important) points using the output signal $G1_j f(x)$ and $G2_j f(x)$ of the first order differentiation type analyzing circuit 52 and the second order differentiation type analyzing circuit 53.

Here, the sum of the squares of the output signal $G1_j f(x)$ and signal $G2_j f(x)$ is easily found, and the maximum value thereof is used as the characteristic point.

The characteristic point detection unit 54 performs the computation indicated by the equation 40:

$$E_j(x)=[G1_j f(x)]^2+[G2_j f(x)]^2 \tag{40}$$

Further, the characteristic point detection unit 54 performs the computation of the differentiated value of this square sum $E_j(x)$ and defines the point at which that differentiated value $E_j(x)'$ becomes zero and maximum as the characteristic point jXn.

The characteristic point detection unit 54 finds the analysis result $G1_j f(jXn)$ and analysis result $G2_j f(jXn)$ at the analyzing filter at this characteristic point jXn and inputs the resultant values to the total coding unit 16.

In the total coding unit 16, the input analysis result $G1_j f(jXn)$ and analysis result $G2_j f(jXn)$ are coded.

As is seen from FIGS. 1A to 1F, where either of the analysis result $G1_j f(x)$ or analysis result $G2_j f(x)$ is the maximum value or minimum value, the value of the other becomes "0" in many cases.

Also, where it is assumed that the signal $f_0(x)$ is an image signal etc., as the biological characteristic of the optical nerves on the retina, nerve cells having receiving fields having shapes resembling the analysis result $G1_j(x)$ and analysis result $G2_j(x)$ that adjoin each other, so there is a possibility of competition between them.

That is, when one of the nerve cells is firing, the other one cannot be firing.

By utilizing this fact, the total coding unit 16 performs the approximation in a manner so that where either of the analysis result $G1_j(x)$ or analysis result $G2_j(x)$ is the maximum value or the minimum value at the characteristic point jXn, the value of the other is regarded to be "0".

By this approximation, it becomes possible for the total coding unit 16 to adaptively select the analysis result including the important information among the results of analysis by a plurality of analyzing filters, for the input signal $f_0(x)$.

The total coding unit 16 defines the data having a larger amplitude among the analysis result $G1_j(x)$ and analysis result $G2_j(x)$ as $Gd_j f(x)$, codes this by an appropriate number of bits, and codes which of the analysis result $G1_j f(x)$ and analysis result $G2_j f(x)$ becomes the extremum value by one bit of data "d".

The data "d" is the data accompanying jXn, and therefore is expressed as the characteristic point data d(jXn) in correspondence to a characteristic point.

Where the analysis result is recorded, it is sufficient if the analysis result having a larger amplitude between the analysis result $G1_j(x)$ and analysis result $G2_j(x)$ and the corresponding characteristic point data $d(jXn)$ be recorded.

For example, where the characteristic point data $d(jXn)=0$, it is assumed that the analysis result $G1_jf(x)$ is used.

Also, in the case of processing a signal including much noise etc., it is also possible to remove results having a small absolute value of the analysis result $Gd_j(x)$ from the object of coding by regarding the same as being the influence of noise according to need.

The characteristic point jXn, the analysis result $Gd_j(x)$, and characteristic point data $d(jXn)$ found as in the above are input to the interpolation estimation unit 61.

Also, the output low frequency component $S_{j,J}(x)$ of the low frequency detection circuit 51 is subjected to transformation such as thinning and is coded. This coded data is input to the adder circuit 65.

Below, an explanation will be made of a case where the interpolation estimation unit 61, the inverse transformation unit 62, the first order differentiation type analyzing circuit 63, and the second order differentiation type analyzing circuit 64 are used for the repetitive calculation for the restoration of a signal.

First, by using the data sent from the total coding unit 16, that is, the characteristic point jXn, the analysis result $Gd_j(jXn)$, and the characteristic point data $d(jXn)$, the interpolation estimation unit 61 performs the interpolation estimation for the original analysis result $G1_jf(x)$ and analysis result $G2_jf(x)$.

As one example of the method used for this interpolation estimation, there is the convex projection method.

First, the interpolation estimation unit 61 finds the $G1_jf(jXn)$ and $G2_jf(jXn)$ using the analysis result $Gd_jf(x)$ at the characteristic point jXn and characteristic point data $d(jXn)$.

Note, where the characteristic point data $d(jXn)=1$, the analysis result $G1_jf(x)$ is the analysis result $Gd_jf(x)$, that is, $G1_jf(x)=Gd_jf(jXn)$ and the value of the analysis result $G2_jf(x)$ is 0, i.e, $G2_jf(jXn)=0$.

In the case other than the above description {characteristic point data $d(jXn)=0$}, the analysis result $Gd_jf(jXn)$ is equal to the $G2_jf(x)$, that is, $G2_jf(x)=Gd_jf(jXn)$, and the value of the analysis result $G1_jf(jXn)$ is "0", that is, $G1_jf(jXn)=0$.

The interpolation estimation unit 61 independently interpolates these two sequences, the analysis result $G1_jf(jXn)$ and analysis result $G2_jf(jXn)$.

Figure 9:
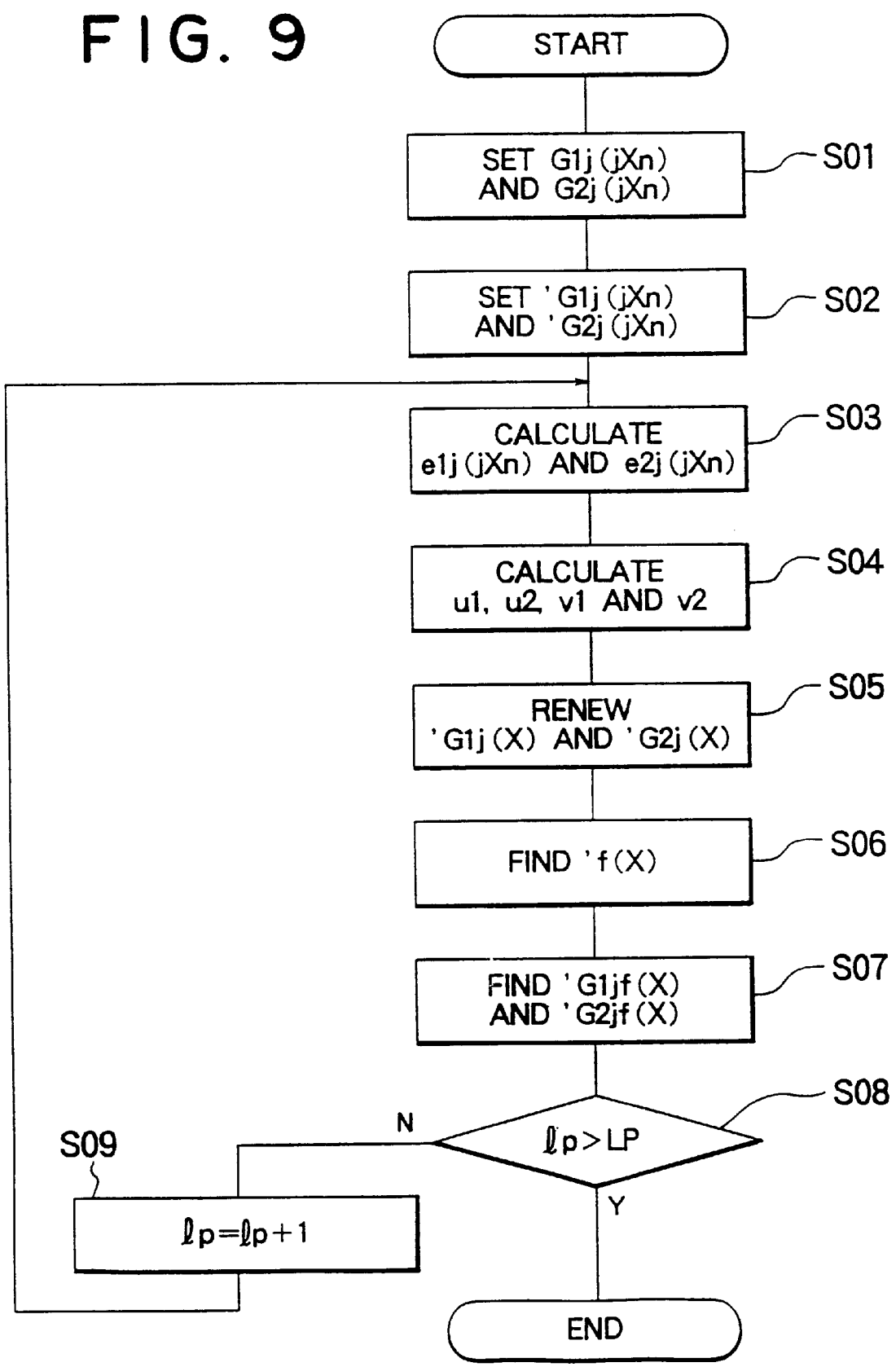
FIG. 9 is a flow chart of the processing in the interpolation estimation performed in the interpolation estimation portion etc.

FIG. 9 is a flow chart of the processing in the interpolation estimation performed in the interpolation estimation unit 61 etc.

In the interpolation estimation unit 61, the interpolation is carried out according to the steps as shown in FIG. 9.

The processing will be summarized below. In this processing, the functions subjected to the interpolation estimation are expressed as the function $'G1_jf(x)$ and the function $'G2_jf(x)$ and the following two constraints are used.

First constraint: The function $'G1_jf(x)$ and the function $'G2_jf(x)$ are those obtained by transforming a certain function (signal) by the analyzing filter $G1_j(x)$ and the analyzing filter $G2_j(x)$.

Second constraint: The function $'G1_jf(x)$ and the function $'G2_jf(x)$ take (allow the passing of) the value of the analysis result $G1_jf(jXn)$ or the analysis result $G2_jf(jXn)$.

The above-described first constraint is applied to the processing at the inverse transformation unit 62, the first order differentiation type analyzing circuit 63, and the second order differentiation type analyzing circuit 64.

The above-described second constraint is applied to the processing at the interpolation estimation unit 61.

A simple explanation will be made of the first constraint.

Where the transformation of a certain function using the analyzing filter $G1_j(x)$ (note, j=j1, ..., jJ) is expressed as the transformation G1 and an inverse transformation to this is expressed as the transformation G1-1, the above-described first constraint corresponds to the application of transformation such as G1 and G1-1 for $'G1_jf(x)$.

Also for the function $'G2_jf(x)$, similarly, where the transformation of a certain function (signal) using the analyzing filter $G2_j(x)$ is expressed as the transformation G2 and an inverse transformation to this is expressed as the transformation G2-1, the above-described first constraint corresponds to the application of transformation such as G2 and G2-1 for $'G2_jf(x)$.

This procedure is carried out for the function $'G1_jf(x)$ and the function $'G2_jf(x)$.

Essentially, the processing indicated in equation 51 mentioned later is carried out.

The entire processing of the interpolation estimation unit 61, the inverse transformation unit 62, the first order differentiation type analyzing circuit 63, and the second order differentiation type analyzing circuit 64 mentioned above will be explained for every processing of each part below.

Below, the operation of the interpolation estimation unit 61 will be explained.

The above-described second constraint corresponds to the processing at the interpolation estimation unit 61.

First, an explanation will be made from the interpolation of the analysis result of the first order differentiation type.

An error function is defined by the following equation:

$$e1_j(x)=G1_jf(x)-'G1_jf(x) \quad (41)$$

This error function $e1_j(x)$ is expressed by equation 42 for the section between characteristic point jXn and characteristic point jX(n+1):

$$e1_j(x)=u1\exp(A(j)x)+v1\exp(-A(j)x) \quad (42)$$

Note, $A(j)$ is the parameter concerning the smoothness of $e1_j(x)$ determined for each scale. For example, $A(j)=2j$ is used.

The interpolation estimation unit 61 finds the error function $e1_j(x)$ using the following two equations for two unknown quantities u1 and v1:

$$e1_j(x_n)=G1_jf(x_n)-'G1_jf(x_n) \quad (43)$$

$$e1_j(x_{n1})=G1_jf(x_{n+1})-'G1_jf(x_{n+1}) \quad (44)$$

The interpolation estimation unit 61 finds the $e1_j(x)$ for each section [jXn, jX(n+1)] using the unknown quantities u1 and v1 found in this way and finds a new interpolation function by renewing the interpolation functions heretofore as in equation 45.

$$'G1_jf(x):='G1_jf(x)+e1(x) \quad (45)$$

Here, := expresses the renewal.

The interpolation estimation unit 61 similarly finds a new interpolation function also for the interpolation function $G2_jf(x)$ That is, the error function is defined by the next equation:

$$e2_j(x)=G2_jf(x)-'G2_jf(x) \quad (46)$$

This error function $e2_j(x)$ is expressed by equation 47 for the section between characteristic point jXn and the characteristic point jX(n+1).

$$e2_j(x)=u2\exp(A(j)x)+v2\exp(-A(j)x) \quad (47)$$

Note, A(j) is a parameter concerning the smoothness of $e1_j(x)$ determined for each scale. For example, A(j)=2j is used.

The interpolation estimation unit 61 finds the error function $e2_j(x)$ using the following two equations for two quantities of the unknown quantity u2 and unknown quantity v2.

$$e2_j(x_n)=G2_jf(x_n)-'G2_jf(x_n) \tag{48}$$

$$e2_j(x_{n1})=G2_jf(x_{n+1})-'G2_jf(x_{n+1}) \tag{49}$$

The interpolation estimation unit 61 finds the error function $e2_j(x)$ for each section [jXn, jX(n+1)] using the error functions u2 and v2 found in this way, and finds a new interpolation function by renewing the interpolation functions heretofore as in equation 50.

$$'G2_jf(x):='G2_jf(x)+e2(x) \tag{50}$$

The aforesaid second constraint is achieved by the renewal processing of the two types of the interpolation function mentioned above.

This interpolation function is input to the inverse transformation unit 62.

An explanation will be made below of the operation of the inverse transformation unit 62.

The inverse transformation unit 62 mutually interpolates the signal space by G1 and G2 by applying an inverse transformation of the results of analysis of the first order differentiation type and second order differentiation type, that is, by the inverse transformation expressed by the equation:

$$f(x) = \frac{1}{2} \sum_{j=jl}^{jJ} [G1_j^*(x) * G1_jf(x) + G2_j^*(x) * G2_jf(x)] \tag{51}$$

Here, the synthesis filters $G1_j^*(x)$ and $G2_j^*(x)$ for inverse transformation are defined by the equations:

$$\hat{G}1_j^*(\omega) = \frac{\overline{\hat{G}1_j(\omega)}}{\sum_{j=jl}^{jJ} [\|\hat{G}1_j(\omega)\|^2 + \|\hat{G}2_j(\omega)\|^2]} \tag{52}$$

$$\hat{G}2_j^*(\omega) = \frac{\overline{\hat{G}1_j(\omega)}}{\sum_{j=jl}^{jJ} [\|\hat{G}1_j(\omega)\|^2 + \|\hat{G}2_j(\omega)\|^2]} \tag{53}$$

The signal f(x) obtained here is input to the first order differentiation type analyzing circuit 63 and the second order differentiation type analyzing circuit 64.

Below, an explanation will be made of the operation of the first order differentiation type analyzing circuit 63 and the second order differentiation type analyzing circuit 64.

In the first order differentiation type analyzing circuit 63 and the second order differentiation type analyzing circuit 64, the computation concerning the above-described second constraint is achieved by the transformations G1 and G2 by the processing expressed by equations 54 and 55:

$$'G1_jf(x)='f(x)*G1_j(x) \tag{54}$$

$$'G2_jf(x)='f(x)*G2_j(x) \tag{55}$$

In FIG. 8, the repetition of the computation processing performed at the interpolation estimation unit 61, the inverse transformation unit 62, the first order differentiation type analyzing circuit 63, and the second order differentiation type analyzing circuit 64 is indicated by a fact that the analysis result $\{G1_jf(x)\}$ and the analysis result $\{G2_jf(x)\}$, which are the outputs of the first order differentiation type analyzing circuit 63 and the second order differentiation type analyzing circuit 64, have been returned to the interpolation estimation unit 61.

By repeating the inverse transformation and analysis as above, the aforesaid first constraint is achieved.

For analysis result $G1_jf(x)$ and analysis result $G2_jf(x)$, the processing indicated in the above-mentioned equations 41 to 55 is repeated at each part. By repeating this procedure several times, a final signal 'f(x) is obtained at the inverse transformation unit 62.

This signal 'f(x) is input to the subtraction circuit 55.

At the adder circuit 65, a signal $S_{j,l}(x)$ of the low frequency detection circuit 51 is added to the signal 'f(x) input from the inverse transformation unit 62, and the original signal $f_0(x)$ is restored as indicated by equation 56:

$$'f_0(x)='f(x)+S_{j,l}(x) \tag{56}$$

Above, the processing for the restoration of the signal $f_0(x)$ is ended.

Below, an explanation will be made of the processing at the interpolation estimation unit 61 mentioned above referring to FIG. 9.

In FIG. 9, at step 01 (S01), the interpolation estimation unit 61 sets the analysis result $G1_jf(x)$ and the analysis result $G2_jf(x)$ and a constant LP determining the number of times of repeated processing.

At step 02 (S02), the interpolation estimation unit 61 calculates the function $'G1_jf(x)$ and the function $'G2_jf(x)$ and inputs the resultant value to the inverse transformation unit 62.

The function $'G1_jf(x)$ and the function $'G2_jf(x)$ are subjected to the inverse transformation at the inverse transformation unit 62, and the resultant values are input to the first order differentiation type analyzing circuit 63 and the second order differentiation type analyzing circuit 64.

Also, a variable lp for counting the number of times of processing is cleared to zero.

At step 03 (S03), the interpolation estimation unit 61 calculates the error function $e1_j(x)$ and the error function $e2_j(x)$.

At step 04 (S04), the interpolation estimation unit 61 calculates the unknown quantities u1, u2, v1, and v2.

At step 05 (S05), the interpolation estimation unit 61 renews the function $'G1_jf(x)$ and the function $'G2_jf(x)$.

At step 06 (S06), the inverse transformation unit 62 calculates the signal 'f(x).

At step 07 (S07), the first order differentiation type analyzing circuit 63 and the second order differentiation type analyzing circuit 64 calculate the function $\{'G1_jf(x)\}$ and the function $\{'G2_jf(x)\}$ and input the same to the interpolation estimation unit 61.

The signal compression method in the aforesaid information coding unit 15 and the interpolation and inverse transformation method of the signal in the information reproduction unit 22 include modifications as mentioned below.

Below, an explanation will be made of the modifications of the signal analysis and synthesis method of the present invention and an apparatus thereof for each part.

In the above-mentioned embodiment, as the analyzing filter, use was made of a filter having a characteristic of first order differentiation and second order differentiation of a Gauss function, but the analyzing filter is not restricted to this. A filter having another characteristic of a differentiation function as will be mentioned later can be used too.

Also, a similar effect can be expected not only by the combination of analyzing filters having characteristics of a first order differentiation and a second order differentiation, but also by the combination of analyzing filters having any combination of even number orders and odd number orders including the 0-th order.

Also, as the analyzing filter, it is also possible to use not only the combination of the characteristics of the differentiation systems, but also the combination of Hilbert-transformation pairs.

For example, the differentiation G1 of the Gauss function and the Hilbert-transformation pair H1 thereof.

Note that, the Hilbert-transformations H(x) of the function G(x) are linked by equation 57 in the frequency domains.

$$\hat{H}(\omega) = \begin{cases} -i\hat{G}(\omega) & \text{for } \omega < 0 \\ i\hat{G}(\omega) & \text{for } \omega \geq 0 \end{cases} \tag{57}$$

Also, a pair obtained by forming a window in the cosine function and sine function is a specific example of the above-described Hilbert-transformation pair.

Also, a Gabor function using a Gaussian function as a window function is one example of this.

Below, a description will be made of a modification of the total coding unit 16.

In the above-described embodiment, where either the analysis result $G1_j f(x)$ or the analysis result $G2_j f(x)$ is the maximum value or minimum value, an approximation was carried out so that the value of the other was "0", but it is also possible to arrange the same so as to raise the degree of precision by a method of reducing the bit allocation in an analysis result having a value nearer to zero and increasing this in the analysis result having the extremum value.

Below, a modification of the interpolation estimation unit 61 will be described.

In the above-described embodiment, the first order differentiation system (method) and the second order differentiation system (method) were independently interpolated for the analysis result of the analyzing filter, but the analysis result of the second order differentiation system can be found by one more differentiation of the analysis result of the first order differentiation system.

For this reason, the arrangement can be made so that the analysis result of the second order differentiation system is found from the analysis result of the first order differentiation system.

Alternatively, it is possible to establish four equations by the analysis result of the first order differentiation system and the analysis result of the second order differentiation system with respect to the two points of the characteristic point jXn and characteristic point jX(n+1).

Accordingly, it is possible to arrange the same so that the interpolation is carried out by a function having four parameters.

In any case, the above-mentioned repetition of calculation is not indispensable.

In the above-described embodiment, a description was made of a case of a one-dimensional signal as in the case where for example characteristic points constituting a curve were processed using the image processing apparatus 1. An explanation will be made of a modification of a case where the signal processing method used in the image processing apparatus 1 is extended to for example two-dimensional image signal processing.

An extension of the signal analysis and synthesis method of the above-described embodiment and an apparatus thereof to the analysis and synthesis of a two-dimensional signal can be achieved by performing them while dividing the analysis and synthesis of the above-described one-dimensional signal to those in the lateral direction and vertical direction.

Below, an explanation will be made of a method using a signal partially differentiated in the x-direction and signal partially differentiated in the y-direction by applying a smoothing filter in the two dimensions.

Here, a Hilbert-transformation pair is used as the characteristic of the analyzing filter.

It is assumed that the smoothing filter is $G0_j(x,y)$ and the indexes concerning the scale are $j=j1, j2, \ldots, jJ$.

The characteristic of the analyzing filter of the first order differentiation type is defined by equations 58 and 59:

$$G1_j^1(x, y) = \frac{\partial}{\partial x} G0_j(x, y) \tag{58}$$

$$G1_j^2(x, y) = \frac{\partial}{\partial x} G0_j(x, y) \tag{59}$$

This Hilbert-transformation pair is also expressed as $_1H1_j(x,y)$ and $_2H1_j(x,y)$.

As the characteristic of the analyzing filter, the computation where $_1G1_j(x,y)$ and $_2G1_j(x,y)$ are expressed by the equations 60 and 61:

$$_1G1_j f(x,y) = {}_1G1_j(x,y) ** f(x,y) \tag{60}$$

$$_2G1_j f(x,y) = {}_2G1_j(x,y) ** f(x,y) \tag{61}$$

In this case, as the characteristic of the synthesis filter for the inverse transformation, one expressed by equations 62 and 63.

$$_1\hat{G}1_j^*(u, v) = \frac{{}_1\overline{\hat{G}}1_j(u, v)}{C(u, v)} \tag{62}$$

$$_2\hat{G}1_j^*(u, v) = \frac{{}_2\overline{\hat{G}}1_j(u, v)}{C(u, v)} \tag{63}$$

Note, the performance of a Fourier transformation in the equations is indicated by a symbol ^, and the taking of the complex conjugate number is indicated by a lateral line in the equations.

Also, C(u,v) in the equations is defined by equation 64:

$$C(u, v) = \sum_{j=j1}^{jJ} \left[ \left\| {}_1\hat{G}1_j(u, v) \right\|^2 + \left\| {}_2\hat{G}1_j(u, v) \right\|^2 \right] \tag{64}$$

Accordingly, the synthesis is expressed by equation 65:

$$f(x, y) = \sum_{j=j1}^{jJ} [{}_1G1_j^* ** {}_1G_j f(x, y) + {}_2G1_j^* ** {}_2G_j f(x, y)] \tag{65}$$

Further, the function $M_j f(x,y)$ is defined as follows:

$$M_j f(x, y) = \sqrt{[{}_1W_j f(x, y)]^2 + [{}_2W_j f(x, y)]^2} \tag{66}$$

-continued $$A_j f(x, y) = \tan^{-1}\left[\frac{{}_2W_j f(x, y)}{{}_1W_j f(x, y)}\right] \tag{67}$$

By using only the maximum value of this function $M_j(x, y)$, the interpolation and synthesis can be carried out using the convex projection method.

Here, an explanation will be made of a method using the G1 type and H1 type and further utilizing the visual characteristic. First, synthesis based on the case of use of both of the G1 type and H1 type is defined. The synthesis function is changed as follows:

$$_1\hat{G}1_j^*(u, v) = \frac{{}_1\overline{G}1_j(u, v)}{C2(u, v)} \tag{68}$$

$$_2\hat{G}1_j^*(u, v) = \frac{{}_2\overline{G}1_j(u, v)}{C2(u, v)} \tag{69}$$

$$_1\hat{H}1_j^*(u, v) = \frac{{}_1\overline{H}1_j(u, v)}{C2(u, v)} \tag{70}$$

$$_2\hat{H}1_j^*(u, v) = \frac{{}_2\overline{H}1_j(u, v)}{C2(u, v)} \tag{71}$$

Note, the following holds:

$$C2(u, v) = \sum_{j=jl}^{jJ}\left[\left\|{}_1\hat{G}1_j(u, v)\right\|^2 + \left\|{}_2\hat{G}1_j(u, v)\right\|^2 + \left\|{}_1\hat{H}1_j(u, v)\right\|^2 + \left\|{}_2\hat{H}1_j(u, v)\right\|^2\right] \tag{72}$$

Here, it is necessary to note C2=2C.
The inverse transformation becomes:

$$f(x, y) = \sum_{j=jl}^{jJ}[{}_1G1_j^* **{}_1G1_j f(x, y) + {}_2G1_j^* **{}_2G1_j f(x, y) + {}_1H1_j^* **{}_1H1_j f(x, y) + {}_2H1_j^* **{}_2H1_j f(x, y)] \tag{73}$$

Those equations mentioned above are the basic analysis and synthesis. Next, the following two assumptions are introduced as the visual characteristics:

Assumption 1: At a point at which the G1 type gives the extremum value, the value of the output of the H1 type becomes 0 or a value near 0.

Assumption 2: At a point at which the H1 type gives the extremum value, the value of the output of the G1 type becomes 0 or a value near 0.

An extension of the above-described processing method to the two-dimensional signal processing is qualitatively an extension of the assumption in one dimension, but in a two-dimensional space, the even function and odd function can not be defined unless the direction is set in the two-dimensional space.

This is equivalent to the performance of the analysis and synthesis by the one-dimensional pair mentioned before in that direction. On the other hand, it is also possible to detect the angle by the ratio between 1G1j and 2G1j, and it is also possible to perform the same by the ratio between 1H1j and 2H1j.

By synthesizing the above, in the extended signal analysis method, the following analysis is carried out.

First, the equation:

$$M_j(x, y) = \left[[{}_1G1_j f(x, y)]^2 + [{}_2G1_j f(x, y)]^2 + [{}_1H1_j f(x, y)]^2 + [{}_2H1_j f(x, y)]^2\right]^{1/2} \tag{74}$$

is set, and the maximum point thereof is found.

That maximum point is expressed as (jxn,jyn).

Note, n=1, 2, ..., N are indexes attached to the maximum point.

The aforementioned assumption is regarded not to be a problem in terms of vision even if equation 75 or 76 is thought to approximately stand:

$$[{}_1H1_j f(jx_n, jy_n)]^2 + [{}_2H1_j f(jx_n, jy_n)]^2 = 0 \tag{75}$$

$$[{}_1G1_j f(jx_n, jy_n)]^2 + [{}_2G1_j f(jx_n, jy_n)]^2 = 0 \tag{76}$$

Accordingly, one bit of characteristic point data d expressing which of the above states is exhibited, and the angle information of either of:

$$AG_j(x_n, y_n) = \tan^{-1}\left[\frac{{}_2G1_j f(jx_n, jy_n)}{{}_1G1_j f(jx_n, jy_n)}\right] \tag{77}$$

or $$AH_j(x_n, y_n) = \tan^{-1}\left[\frac{{}_2H1_j f(jx_n, jy_n)}{{}_1H1_j f(jx_n, jy_n)}\right] \tag{78}$$

is necessary.

Note that, in general, if $M_j(x,y)$, $AG_j(x,y)$, $AH_j(x,y)$ and:

$$AA_j(x, y) = \tan^{-1}\left[\frac{\sqrt{[{}_1G1_j f(x, y)]^2 + [{}_2G1_j f(x, y)]^2}}{\sqrt{[{}_1H1_j f(x, y)]^2 + [{}_2H1_j f(x, y)]^2}}\right] \tag{79}$$

are possessed as the information not only at the maximum point, but also at all points (x,y) on a two-dimensional screen, the original four analysis results can be obtained.

By the extended signal analysis and synthesis method, the original signal f(x,y) can be obtained from this analysis result using equation 54.

Concerning the method using only the analysis result of the maximum point only at (jxn,jyn), if $M_j$(jxn,jyn), $AG_j$(jxn,jyn), $AH_j$(jxn,jyn), and $AA_j$(jxn,jyn) are used, the original four analysis results can be found.

Note, since the maximum value of $M_j$(jxn,jyn) does not become the maximum value of both the G1 type and H1 type, the method of Froment mentioned in the conventional example can not be directly used.

However, if the above-mentioned assumption is used, the point (jxn,jyn) gives an extremum value of either the G1 type or H21 type. By using this relationship, in the extended signal analysis and synthesis method, f(x,y) is synthesized as follows.

First, the synthesis from either pair $M_j$(jxn,jyn) and d or $AG_j$(jxn,jyn) and $AH_j$(jxn,jyn) is carried out as follows.

When it is assumed that the value of analysis result of H1 type is 0 (d=0), the following stand:

$$_1G1_j(x_n,y_n) = M_j(x_n,y_n)\cos(AG_j(x_n,y_n)) \tag{80}$$

$$_2G1_j(x_n,y_n) = M_j(x_n,y_n)\sin(AG_j(x_n,y_n)) \tag{81}$$

and in an inverse case to this, the following stand:

$$_1H1_j(x_n,y_n) = M_j(x_n,y_n)\cos(AH_j(x_n,y_n)) \tag{82}$$

$$_2H1_j(x_n,y_n) = M_j(x_n,y_n)\sin(AH_j(x_n,y_n)) \tag{83}$$

In this way, a part of the extrema values of the G1 type and H1 type can be found.

The above-described and subsequent processings in the extended signal analysis and synthesis method are the same as those of the case of the one-dimensional signal mentioned above.

That is, the result of restoration from each side of the G1 type and H1 type are added to obtain an estimated value of f(x,y), which is analyzed again and brought to the convex projection method using the constraint that it is the extremum value. Note, the synthesis filters are:

$$_1\hat{G}1_j^*(u,v) = \frac{_1\overline{G}1_j(u,v)}{C2(u,v)/2} \tag{84}$$

$$_2\hat{G}1_j^*(u,v) = \frac{_2\overline{G}1_j(u,v)}{C2(u,v)/2} \tag{85}$$

$$_1\hat{H}1_j^*(u,v) = \frac{_1\overline{H}1_j(u,v)}{C2(u,v)/2} \tag{86}$$

$$_2\hat{H}1_j^*(u,v) = \frac{_2\overline{H}1_j(u,v)}{C2(u,v)/2} \tag{87}$$

Here, the reason why C2(u,v)/2 is made equal to C(u,v) is that only one output of the G1 type or H1 type is used at each local unit.

As mentioned above, according to the signal analysis and synthesis method of the above-described embodiment and the apparatus thereof, it becomes possible to reduce the amount of data of the results of this method in comparison with the case of analyzing the signal by a usual single type of analyzing filter.

Also, it becomes possible to correctly restore the important part in the signal.

In the above-described embodiment, a signal analysis and synthesis method was explained using the image processing apparatus 1. Needless to say, the signal analysis and synthesis method of the present invention can be applied not only to a dynamic image signal, but also to a signal such as a voice signal.

Figure 10:
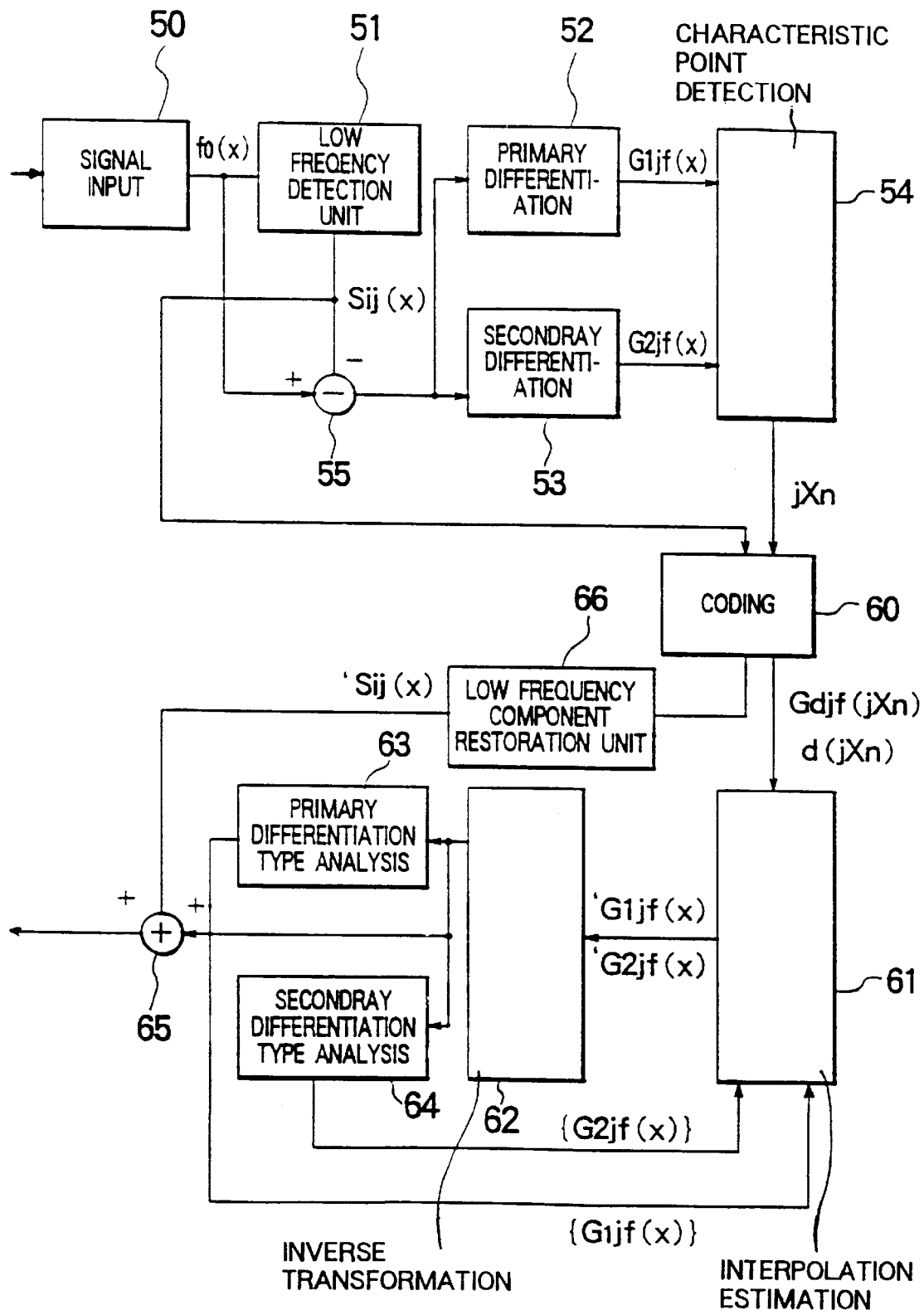
FIG. 10 is a view showing the structure of an image processing apparatus to which the image processing is method of the present invention is applied.

An embodiment of the signal processing apparatus 2 in a case where the aforesaid signal processing method is applied to a signal other than the dynamic image signal is shown in FIG. 10. In FIG. 10, elements corresponding to those in FIG. 7 and FIG. 8 are given the same symbols and a detailed explanation thereof will be omitted.

In FIG. 10, the signal input circuit 50 receives as its input the signal of the analog form to be input to the signal processing apparatus 2. This image signal is subjected to an analog/digital (A/D) conversion to obtain the signal $f_0(x)$ in digital form.

The low frequency detection circuit 51 performs the convolution computation for filtering the signal $S_{j,j}(x)$ of the low frequency component from the signal $f_0(x)$.

The first order differentiation type analyzing circuit 52 receives as its input the signal f(x), where $f(x)=f_0(x)-S_{j,j}(x)$, which is the result of subtraction of the low frequency component signal $S_{j,j}(x)$ extracted at the low frequency detection circuit 51 from the original signal $f_0(x)$ at the subtraction circuit 55, and performs analysis of multiple resolution of a form performing a first order differentiation for this input signal (first order differentiation type).

The second order differentiation type analyzing circuit 53 receives as its input the above-described signal f(x) and performs analysis of multiple resolution of a form performing a second order differentiation for this input signal (second order differentiation type).

The characteristic point detection unit 54 uses the output signal $G1_jf(x)$ of the first order differentiation type analyzing circuit 52 and the output signal $G2_jf(x)$ of the second order differentiation type analyzing circuit 53 and determines the characteristic point jXn thereof.

The subtraction circuit 55 subtracts the signal input from the signal indicated by (−) from the signal input from the input indicated by (+) in FIG. 10 by the digital computation.

The coding circuit 60 codes the value of the signal $G1_jf(jXn)$ and the signal $G2_jf(jXn)$ at the important points jXn of the signal $G1_jf(x)$ and signal $G2_jf(x)$.

The interpolation estimation unit 61 performs the interpolation estimation of the signal $G1_jf(x)$ and the signal $G2_jf(x)$ from the coded data.

The inverse transformation unit 62 uses the interpolation data '$G1_jf(x)$ and '$G2_jf(x)$ of the signal $G1_jf(x)$ and signal $G2_jf(x)$ and performs the inverse transformation for the original signal f(x) to the expanded signal 'f(x).

The first order differentiation type analyzing circuit 63 is a local encoder for finding the interpolation data '$G1_jf(x)$ using the repeated calculation.

The second order differentiation type analyzing circuit 64 is a local encoder for finding the interpolation data '$G2_jf(x)$ using the repeated calculation.

The adder circuit 65 adds the input two signals by the digital computation.

The low frequency expansion unit 66 restores the signal input from the coding circuit 60 after compression and inputs the same to the adder circuit 65.

The outputs of the first order differentiation type analyzing circuit 63 and the second order differentiation type analyzing circuit 64 are returned to the interpolation estimation unit 61 as the signal $\{G1_jf(x)\}$ and signal $\{G2_jf(x)\}$, respectively.

After this computation is repeated several times, 'f(x) is ultimately found.

Finally, the output signal $S_{j,j}(x)$ of the low frequency detection circuit 51 is added to this final 'f(x) and the expanded signal '$f_0(x)$ of $f_0(x)$ is output.

According to the signal processing apparatus 2 shown in FIG. 10, it is possible to make the form of the analyzing filter used for analysis adaptively match the waveform of the input signal, and it is possible to provide an efficient signal processing method and an apparatus thereof with which the amount of the data of the results of analysis for the input signal can be reduced for any signal, for example, a signal extracted from the dynamic image signal.

Below, a description will be made of a modification of the present invention of the image processing apparatus 1 of the present invention in the first embodiment.

In the embodiment, three-dimensional time and space data is analyzed and is used as the set of characteristic points of two dimensions and the information on those characteristic points. The two-dimensional data is analyzed, reduced by one dimension each, then analyzed in construction thereof. Finally, the point information is obtained.

However, as mentioned in the embodiment, if a state where the data can be expressed as a usual two-dimensional function or one-dimensional function is exhibited, compression by a usual DCT (discrete cosine transformation) and vector quantization is possible.

As the filter for analyzing the three-dimensional data, a first order differentiation system of the smoothing function was used, but the present invention is not restricted to this analyzing filter.

No matter what type of analyzing filter is used, so far as the inverse transformation thereof or the approximate inverse transformation exists, a similar operation is possible by using specific points of results of that analyzing filter.

Also, by using two analyzing filters as a pair, it is possible to also use procedures for reducing the number of specific points for the analyzing procedures of the present invention.

In the first embodiment, all of the isolated points, curves, and curved surfaces were used as the analysis results of three dimensions, but it is also possible to consider that the important information exists only in the form of curved surfaces and discard either one or both of the isolated points and curves.

Moreover, it is also possible to consider setting the threshold to the length of linking and surface area or the magnitude of the analysis signal power thereon and to use only the important characteristic points.

In the first embodiment, all scales of characteristic points were independently treated, but it can also be considered to use a relatively fine scale, for example, only j=2, and to subject the other scales to compression using the results of analysis on these characteristic points.

In the first embodiment, the coding on curves was carried out at the information coding unit by assuming three graphs of the analysis result $W_xI(x,y,t: \sigma_j)$, the analysis result $W_yI(x,y,t: \sigma_j)$, and the analysis result $W_tI(x,y,t: \sigma_j)$. They are expressed by the extrema coordinate forms as given by equations 88 to 90:

$$MI(x, y, t; \sigma_j) = \\ sqrt[((W_xI(x, y, t; \sigma_j))^2 + (W_yI(x, y, t; \sigma_j))^2 + (W_tI(x, y, t; \sigma_j))^2] \quad (88)$$

$$AI(x, y, t; \sigma_j) = \tan^{-1}(W_xI(x, y, t; \sigma_j)/(W_yI(x, y, t; \sigma_j))) \quad (89)$$

$$BI(x, y, t; \sigma_j) = \tan^{-1}\left[\frac{(W_tI(x, y, t; \sigma_j))}{\sqrt{(W_xI(x, y, t; \sigma_j))^2 + (W_yI(x, y, t; \sigma_j))^2}}\right] \quad (90)$$

Consideration may be given to another method which utilizes the facts that this angle coincides with the normal direction of the curve and curved surface constituted by characteristic points, codes only $MI(x,y,t: \sigma_j)$, and finds $AI(x,y,t: \sigma_j)$ and $BI(x,y,t: \sigma_j)$ from the curve and curved surface constituted by the characteristic points.

The sending of an error signal of the result of processing in the first embodiment by appropriate compression procedures (for example, DCT and vector quantization) leads to an improvement of the image quality.

Below, an explanation will be made of a second embodiment of the present invention.

In the second embodiment, the characteristic point detection unit 13, the characteristic point coding unit 14, the information coding unit 15, and the information reproduction unit 22 in the first embodiment are changed.

First, at the characteristic point detection unit 13, the maximum point of equation 88 is detected.

Next, at the characteristic point coding unit 14, points giving the maximum value detected at the characteristic point detection unit 13 are linked in the same way as in the first embodiment and classified into isolated points, curves, and curved surfaces.

For the isolated points, the characteristic point coding unit 14 uses the three-dimensional coordinates thereof as the necessary data in the same way as in the first embodiment.

For curves, the characteristic point coding unit 14 uses the characteristic points of the start point, curvature, and twisting rate of groups of obtained curves as the necessary data using an algorithm of analysis of curves in a three-dimensional space.

Next, in the information coding unit 15, on the isolated points, curves, and curved surfaces constituted by the characteristic points, the analysis result at those points are coded as follows.

First, at the isolated points, the information coding unit 15 uses the analysis result $W_xI(x,y,t: \sigma_j)$, analysis result $W_yI(x,y,t: \sigma_j)$, and the analysis result $W_tI(x,y,t: \sigma_j)$ at those points as the necessary data.

Next, for curves, the information coding unit 15 takes the length l from the start point as the parameter in the same way as the first embodiment, compresses the three graphs of analysis result $W_xI(x,y,t: \sigma_j)$, analysis result $W_yI(x,y,t: \sigma_j)$, and the analysis result $W_tI(x,y,t:\sigma_j)$ as the one-dimensional signal, and uses the compression result thereof as the necessary data.

Next, for curved surfaces, the value $M(x,y,t: \sigma_j)$ of equation 88 on the group of curves obtained at the information coding unit 15 is considered. It is considered that $M(x,y,t: \sigma_j)$ is expressed by a function using the length s from the start point of each curve as the parameter. The information coding unit 15 performs the compression while regarding the above-described function as a one-dimensional signal and uses this compression result as the necessary data.

The above necessary data is input to the information reproduction unit 22 through the total coding unit 16 and the total reproduction unit 20 in the same way as the first embodiment.

In the information reproduction unit 22, first the positions of the characteristic points are reproduced from the data concerning the positions of the characteristic points. For the data concerning the isolated transition, data concerning the coordinates thereof is sent, and therefore it is possible to obtain the positions of the isolated points directly.

The information reproduction unit 22 obtains the positions of characteristic points in three-dimensional space constituting a curve using an algorithm of synthesis of a curve in a three-dimensional space mentioned later for curves.

The information reproduction unit 22 obtains the positions of characteristic points in three-dimensional space constituting the curved surface using an algorithm of synthesis of a curve in a three-dimensional space mentioned later for curved surfaces.

Next, in the information reproduction unit 22, the results of analysis of the characteristic points are reproduced.

In the case of isolated points, the data concerning the analysis results is sent as it is, and therefore the information reproduction unit 22 obtains the necessary analysis results directly.

In the case of curves, the respective results of analysis are used as the one-dimensional signals as the function of length s from the start point. This is further compressed. Therefore the information reproduction unit 22 reproduces the one-dimensional signals and establishes correspondence of the values of the signals with the points of length s from the start point of the curve, thereby obtaining the results of analysis on the characteristic points constituting the curve.

In the case of curved surfaces, the value $M(x,y,t: \sigma_j)$ of equation 88 is considered on the group of curves constituting this. This is compressed, and therefore the information reproduction unit 22 reproduces $M(x,y,t: \sigma_j)$ thereof in the same way as in the case of the curves.

Next, at the characteristic point having the value of the reproduced $M(x,y,t: \sigma_j)$, the information reproduction unit 22 finds the unit normal line vector of the curved surface and sets the results obtained by multiplying the x component, y component, and t component of this vector by $M(x,y,t: \sigma_j)$ as the analysis result $W_x I(x,y,t: \sigma_j)$, the analysis result $W_y I(x,y,t: \sigma_j)$, and the analysis result $W_t I(x,y,t: \sigma_j)$, respectively, to obtain the overall analysis result.

Below, an explanation will be made of the algorithm of analysis and synthesis of a curve in a three-dimensional space and the algorithm of synthesis of a curved surface in a three-dimensional space at the characteristic point coding unit 14 and the information reproduction unit 22.

Note that, for brevity, the explanation will be started from the algorithm of the analysis and synthesis of a curve on a plane.

Here, consider the method of expression of a curve on a two-dimensional plane. First, by using the curve as the parameter s, the position on the two-dimensional plane is set as:

$$P(s)=(x(s),y(s)) \tag{91}$$

Usually, it is possible to set $\|p(s)\|=\|\partial p(s)/\partial s\|=1$ while defining, as the distance of movement of s from the time 0 to time t, s=s (t). On the other hand, if the unit tangent vector of p(s) at the length s is e1, equation 92 holds.

$$e_1(s)=P'(s) \tag{92}$$

A unit vector vertical to $e_1(s)$ is defined as $e_2(s)$. Note, it is assumed that this unit vector corresponds to another unit vector obtained by rotating $e_1(s)$ by 90 degrees in the counterclockwise direction.

That is, if $e_1(s)$ is defined as:

$$e_1(s)=[x'(s),Y'(s)] \tag{93}$$

$e_2(s)$ can be expressed as:

$$e_2(s)=[-y'(s),t'(s)] \tag{94}$$

On the other hand, if an inner product $e_1(s) \cdot e_1(s)=1$ is differentiated, the following is obtained:

$$(e_1(s) \cdot e_1)'=e_1'(s) \cdot e_1(s)+e_1(s) \cdot e1'(s)=0 \tag{95}$$

Accordingly, from $e'1(s) \cdot e1(s)=0$, it can be shown that:

$$e_1'(s)=k(s)e_2(s) \tag{96}$$

where k(s) is called the curvature of the curve p(s) at s.

By using this, the curve p(s) can be expressed as:

$$p(s)=p(s_i)+p'(s_i)(s-s_i)+\tfrac{1}{2}p''(s_i)(s-s_i)^2+\ldots \tag{97}$$

$$p(s)=p(s_i)+e_1(s_i)(s-s_i)+\tfrac{1}{2}k(s_i)e_2(s_i)(s-s_i)^2+\ldots \tag{98}$$

On the other hand, $e_1(s)$ is:

$$e_1(s)=e_1(s_i)+e'(s_i)(s-s_i)+\ldots \tag{99}$$

$$e_1(s)=e_1(s_i)+k(s_i)e_2(s_i)(s-s_i)+\ldots \tag{100}$$

and $e_2(s)$ is found uniquely from $e_1(s)$ by:

$$e_2(s)=[-e_1|_y, e_1|_x] \tag{101}$$

Note, in the above equations, $|_x$ indicates the x component of that vector and $|_y$ indicates the y component.

From equations 90 to 101, it is indicated that p(s) can be determined from initial values $p(s_1)$, $e_1(s_1)$, and k(s). Essentially, it becomes as follows.

Below, an explanation will be made of the algorithm of analysis of a curve on a two-dimensional plane at the characteristic point coding unit 14.

Figure 11:
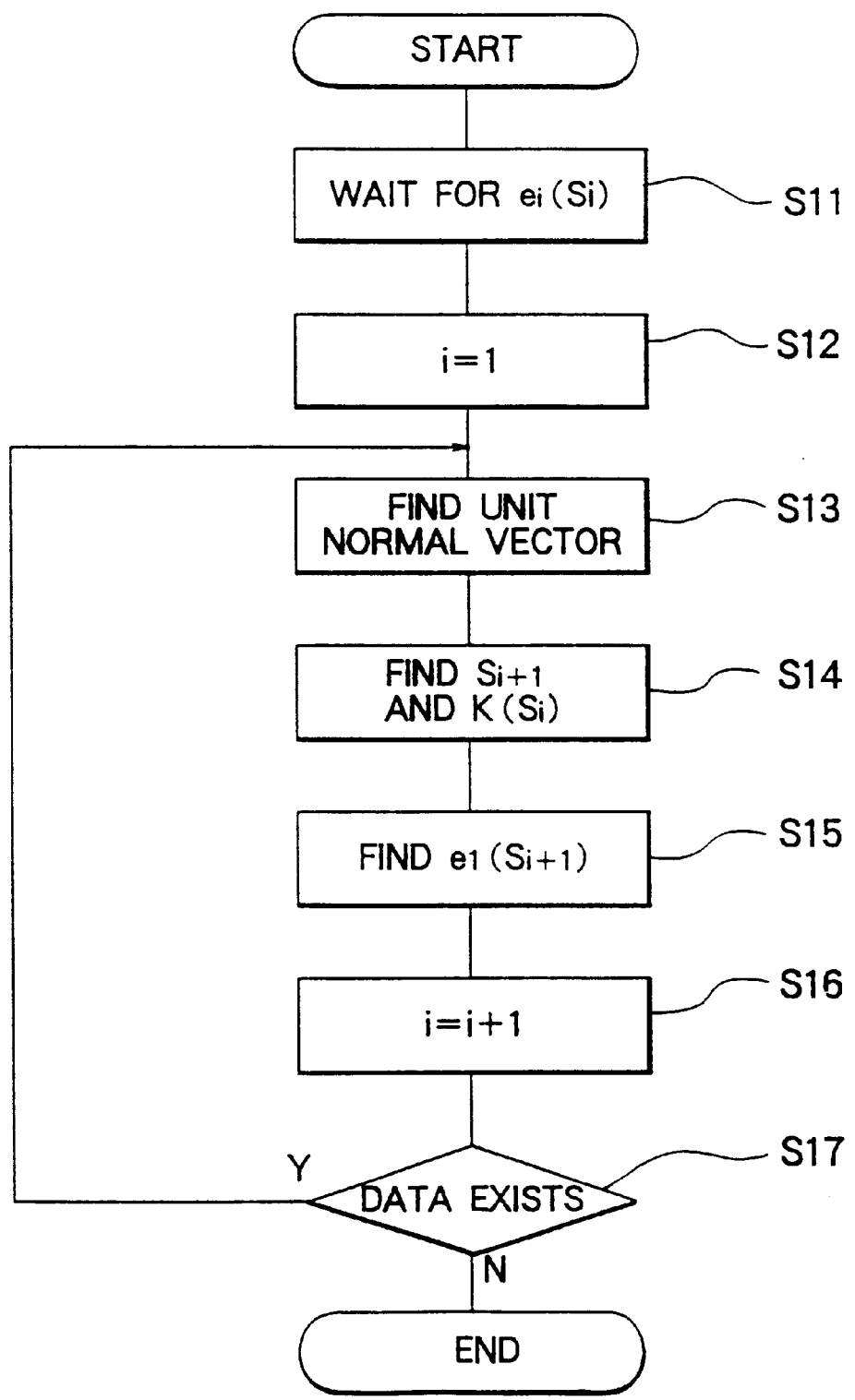
FIG. 11 is a view showing the analyzing processing of a curve on a two-dimensional plane.

FIG. 11 is a flow chart showing the processing for analyzing a curve on a two-dimensional plane in the characteristic point coding unit 14.

In FIG. 11, at step 11 (S11), the start point $p(s_i)$ and the unit tangent vector $e_i(s_i)$ at the start point $p(s_i)$ are held as the data.

At step 12 (S12), i=1 is set.

At step 13 (S13), the unit normal vector is found from the unit tangent vector $e_i(s_i)$ by using equation 102:

$$e_2(s_i)=[-e_1(s_i)|_y, e_1(s_i)|_x] \tag{102}$$

At step 14 (S14), si+1 and k(si) are found by using equation 103.

$$p(s_{i+1})=p(s_i)+e_1(s_i)+\tfrac{1}{2}k(s_i)e_2(s_i)(s_{i+1}-s_i)^2 \tag{103}$$

Note, equation 103 is solved while assuming that k(s) is constant in the interval $[S_{i+1}, S_i]$.

At step 15 (S15), the unit tangent vector $e_1(s_{i+1})$ at the next point $p(s_{i+1})$ is found.

$$e_1(s_{i+1}) = \frac{e_1(s_i) + k(s_i)(s_{i+1}-s_i)}{\|e_1(s_i) + k(s_i)(s_{i+1}-s_i)\|} \tag{104}$$

At step 16 (S16), an increment i=i+1 is carried out.

At step 17 (S17), it is decided whether the data exists, and if the data exists, the routine advances to the processing of S13.

In this way, $k(s_i)$, i=1, . . . , N is found on the curve at the information reproduction unit 22.

The fact that the original curve p(s) can be restored conversely by using this $k(s_i)$ and initial value is indicated. It is now assumed that si is known at i=1, . . . , N.

Below, the algorithm of synthesis of a curve on a two-dimensional plane at the information reproduction unit 22 is described.

Figure 12:
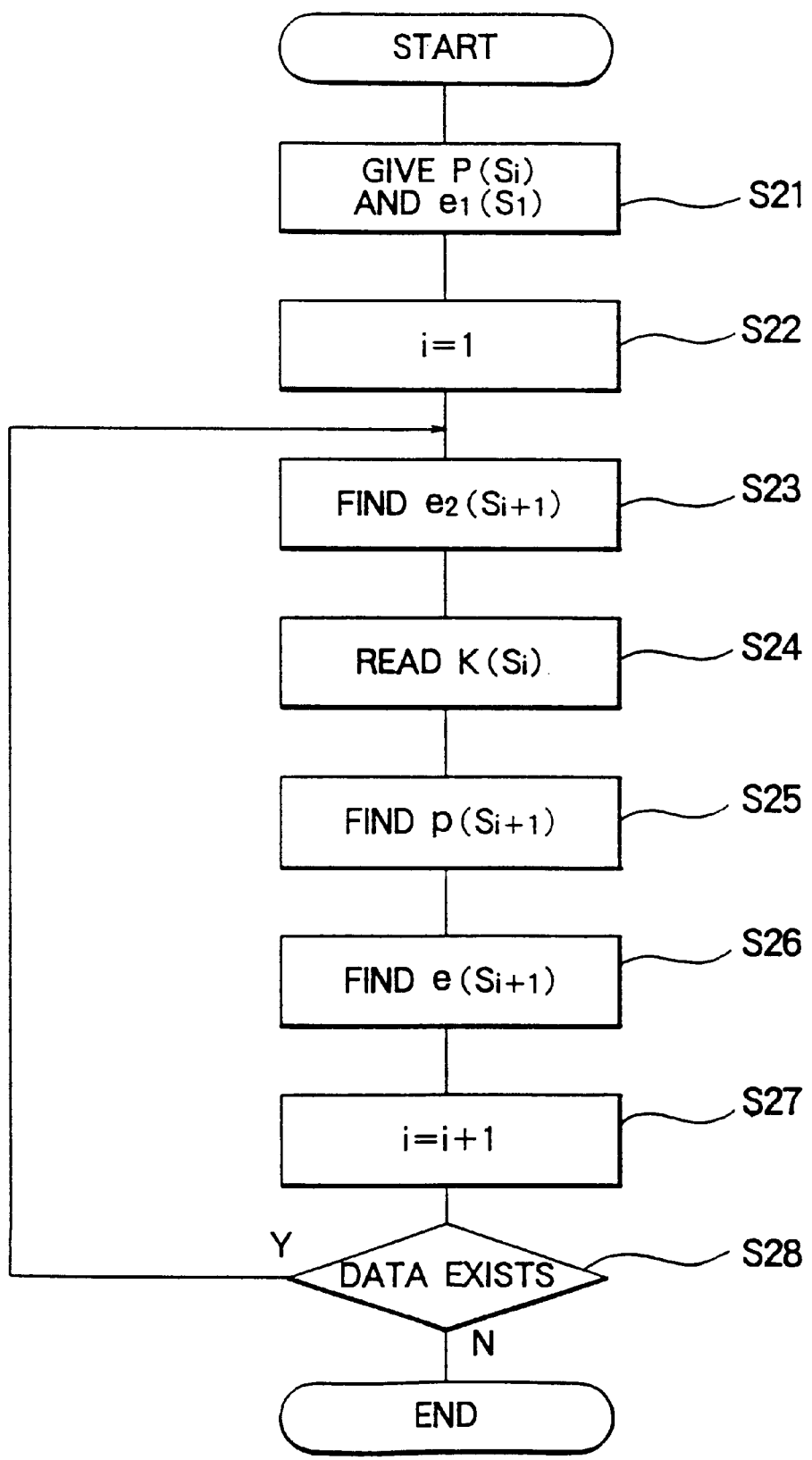
FIG. 12 is a view showing the synthesizing processing of a curve on a two-dimensional plane.

FIG. 12 is a flow chart showing the processing for synthesizing a curve on a two-dimensional plane in the information reproduction unit 22.

In FIG. 12, at step 21 (S21), initial values $p(s_1)$ and $e_1(s_1)$ are given.

At step 22 (S22), i=1 is set.

At step 23 (S23), $e_2(s_{i+1})$ is found by equation 105:

$$e_2(s_i)=[-e_1(s_i)|_y, e_1(s_i)|_x] \tag{105}$$

At step 24 (S24), $k(s_i)$ is read.

At step 25 (S25), $p(s_{i+1})$ is found by equation 106:

$$p(s_{i+1})=p(s_i)+e_1(s_i)+\tfrac{1}{2}k(s_i)e_2(s_i)(s_{i+1}-s_i)^2 \tag{106}$$

At step 26 (S26), $e_1(s_{i+1})$ is found by equation 107:

$$e_1(s_{i+1})=e_1(s_i)+k(s_i)e_2(s_i)(s_{i+1}-s_i) \tag{107}$$

At step 27 (S27), an increment i=i+1 is carried out.

At step 28 (S28), it is decided whether the data exists, and if the data exists the routine advances to the processing of step 23 (S23).

Actually, $s_i$ is not held as the data. This can be solved by interpolating the $k(s_i)$ side and forming k(s) so that the $s_{i+1}-s_i$ always becomes constant. In this case, it is also possible to cope with the case where $p(s_i)$ stops with the precision of a subpixel.

Below, an explanation will be made of the analysis and synthesis of curvature in the characteristic point coding unit 14 and the information reproduction unit 22.

At the characteristic point coding unit 14, an explanation has been made of a method of finding the curvature k(s) of the curve p(s) on a plane and finding the original curve p(s) using this. By the already reported method, the characteristic point coding unit 14 performs the multiple resolution analysis of this curvature, thereby finding the specific points thereof, and can find the original curvature k(s) from the information at the specific points.

Accordingly, it is sufficient if, at the characteristic point coding unit 14, the analysis of the extrema values by multiple resolution is carried out while regarding the curvature k(s) found by the algorithm of analysis of the curve on a two-dimensional plane mentioned before as a single-valued function concerning the length (parameter) s, and that point and the analysis result thereat are stored. Of course, it is also possible to use pairs of those for the analysis.

Here, the analysis and synthesis of a curve in a three-dimensional space at the characteristic point coding unit 14 and the information reproduction unit 22 are considered. Note, this is for considering the expression of a curve on a curve. As will be mentioned later, this result is used for a curve formed by linking the specific points of a curve cut from the curved surface in other directions (it acts as the curve on the curved surface).

Curves p1(s)={x(s),y(s),t(s)} are considered on the curved surfaces pp(u,v)={x(u,v),y(u,v),t(u,v)}. Here, if the unit tangent vector of the curve p1(s) is defined as:

$$e_1(s) = p1'(s) \tag{108}$$

the unit vector $e_2(s)$ can be selected so as to be vertical to this.

The relationships of $e_2(s)$ and $e_1(s)$ are linked by the curvature mentioned later. The normal unit vector of this tangent plane is expressed as $e_3(s)$. Note, equation 109 holds:

$$e_3(s) = e_1 \times e_2 \tag{109}$$

Note, × is a vector product.

In the case of a curve in a space, the curvature k(s) is defined as follows:

$$k(s) = \sqrt{e_1'(s) e_1'(s)} \tag{110}$$

Additionally, equation 111 holds:

$$e_1'(s) = k(s) e_2(s) \tag{111}$$

Moreover, equation 112 holds:

$$e_3'(s) = -\tau(s) e_2(s) \tag{112}$$

This τ(s) is called the twisting rate. The following relationship exists between these $e_1$, $e_2$, and $e_3$ and the differentiation thereof.

$$\begin{bmatrix} e_1'(s) \\ e_2'(s) \\ e_3'(s) \end{bmatrix} = \begin{bmatrix} 0 & k(s) & 0 \\ -k(s) & 0 & \tau(s) \\ 0 & -\tau(s) & 0 \end{bmatrix} \begin{bmatrix} e_1(s) \\ e_2(s) \\ e_3(s) \end{bmatrix} \tag{113}$$

When these k(s)≧0 and τ(s) are given, if the initial values $e_1(s_1)$, $e_2(s_1)$, and $e_3(s_1)$ are known, $e_1(s)$, $e_2(s)$, and $e_3(s)$ can be uniquely determined. From the start point p1($s_i$) and the result of this, they can be found from equation 114:

$$p1(s) = \int_{sI}^{s} e_1(s) ds + p1(s_i) \tag{114}$$

In actuality, the curve p1(s) is subjected to Taylor development to the third order at s=$s_i$, and equation 115, called a Bouquet formula, is used:

$$p1(s) = P1(s_i) + e_1(s_i)(s - s_i) + k(s_i)e_2(s_i)(s - s_i)^2/2 + \tag{115}$$
$$1/6(-k(s_i)^2 e_1(s_i) + k'(s_i)e_2(s_i) + k(s_i)\tau(s_i)e_3(s_i))(s - s_i)^3$$

Accordingly, it is possible to find si, k(si), and τ(si) by the following steps.

Below, an algorithm for analysis of a curve in a three-dimensional space at the characteristic point coding unit 14 is shown.

Figure 13:
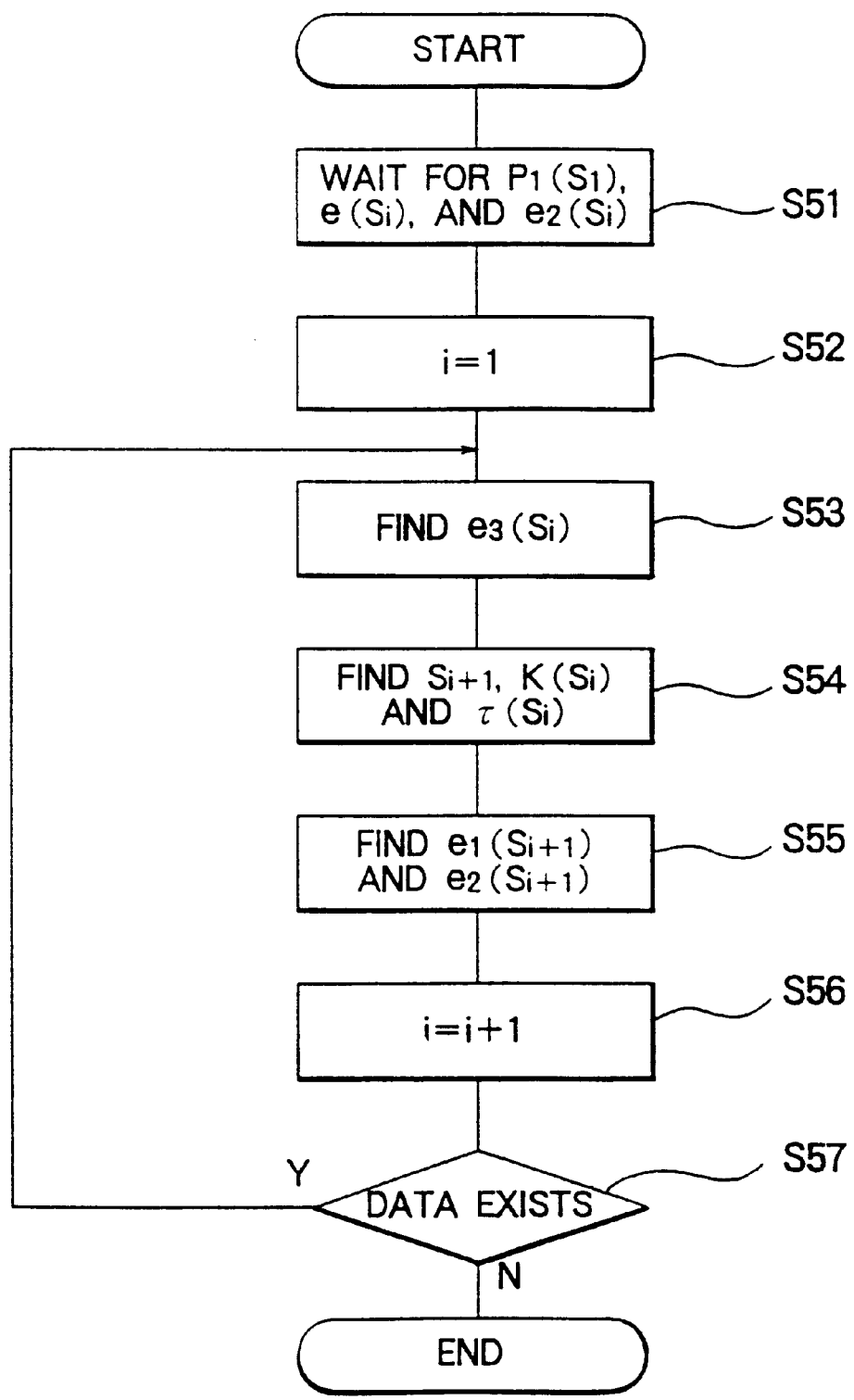
FIG. 13 is a view showing the analyzing processing of a curve in a three-dimensional space.

FIG. 13 is a flow chart of the processing for analyzing a curve in a three-dimensional space in the characteristic point coding unit 14.

In FIG. 13, at step 51 (S51), as the initial values, start points p1($s_1$), $e_1(s_1)$, and $e_2(s_1)$ are held as the data.

At step 52 (S52), i=1 is set.

At step 53 (S53), e3(si) is found by the next equation:

$$e_3(s_i) = e_2(s_i) \times e_1(s_i) \tag{116}$$

At step 54 (S54), p($s_{i+1}$) is read, and $s_{i+1}$, k($s_i$), and τ($s_i$) are found by using equation 117:

$$p1 = P1(s_i) + e_1(s_i)(s_{i+1} - s_i) + k(s_i)e_2(s_i)(s_{i+1} - s_i)^2/2 + \tag{117}$$
$$1/6 (-k(s_i)^2 e_1(s_i) + k'(s_i)e_2(s_i) + k(s_i)\tau(s_i)e_3(s_i))(s_{i+1} - s_i)^3$$

Note, k'(s) is made equal to 0 in the interval [$s_i$, $s_{i+1}$].

At step 55(S55), $e_1(s_{i+1})$ and $e_2(s_{i+1})$ are found by equations 118 and 119:

$$e_1(s_{i+1}) = \frac{e_1(s_i) + k(s_i)e_2(s_i)(s_{i+1} - s_i)}{\|e_1(s_i) + k(s_i)e_2(s_i)(s_{i+1} - s_i)\|} \tag{118}$$

$$e_2(s_{i+1}) = \frac{e_2(s_i) - k(s_i)e_1(s_i)(s_{i+1} - s_i) + \tau(s_i)e_3(s_i)(s_{i+1} - s_i)}{\|e_2(s_i) - k(s_i)e_1(s_i)(s_{i+1} - s_i) + \tau(s_i)e_3(s_i)(s_{i+1} - s_i)\|} \tag{119}$$

At step 56 (S56), an incrementation, i=i+1 is carried out.

At step 57 (S57), it is decided whether the data exists, and if the data exists, the routine advances to the processing of S53.

In this way, k($s_i$), τ($s_i$), and i=1, 2, . . . , N are found.

Below, an explanation will be made of the algorithm of synthesis of a curve in a three-dimensional space at the information reproduction unit 22.

Conversely, p1($s_i$) can be restored as follows from the k($s_i$), τ($s_i$), i=1, 2, . . . , N, and initial values.

Figure 14:
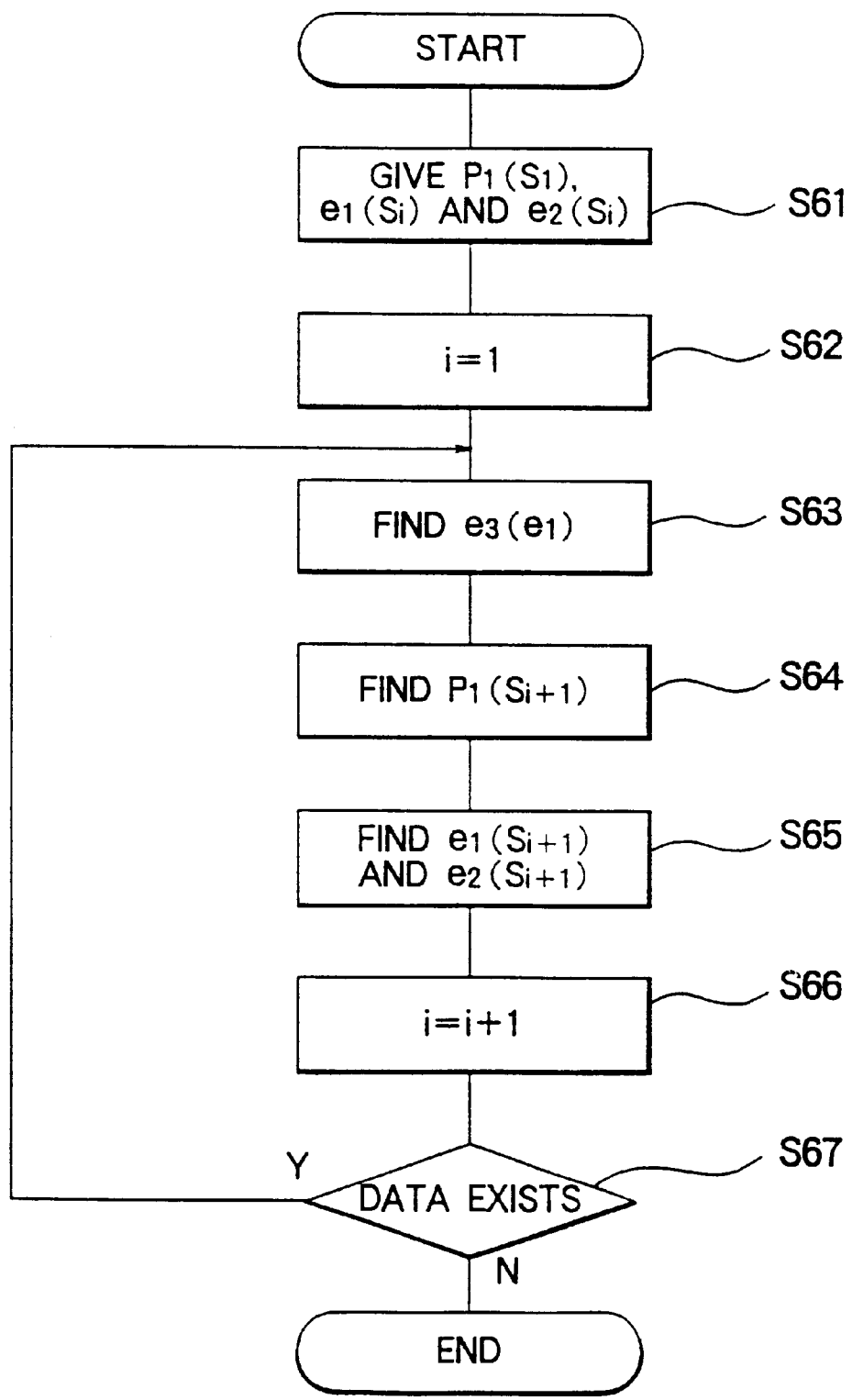
FIG. 14 is a view showing the synthesizing processing of a curve in a three-dimensional space.

FIG. 14 is a flow chart showing the processing for synthesizing a curve in a three-dimensional space at the information reproduction unit 22.

In FIG. 14, at step 61 (S61), initial values p1($s_1$), $e_1(s_1)$, and $e_2(s_1)$ are given.

At step 62 (S62), i=1 is set.

At step 63 (S63), $e_3(s_i)$ is found by using equation 120:

$$e_3(s_i) = e_2(s_i) \times e_1(s_i) \tag{120}$$

At step 64 (S64), k($s_i$) and τ($s_i$) are read, and p1($s_{i+1}$) is found from $s_{i+1}$, k($s_i$), and τ($s_i$) using equation 121:

$$p1 = P1(s_i) + e_1(s_i)(s_{i+1} - s_i) + k(s_i)e_2(s_i)(s_{i+1} - s_i)^2/2 + \qquad (121)$$
$$1/6 \ (-k(s_i)^2 e_1(s_i) + k'(s_i)e_2(s_i) + k(s_i)T(s_i)e_3(s_i))(s_{i+1} - s_i)^3$$

At step 65 (S65), $e_1(s_{i+1})$ and $e_2(s_{i+1})$ are found using equations 122 and 123:

$$e_i(s_{i+1}) = \frac{e_1(s_i) + k(s_i)e_2(s_i)(s_{i+1} - s_i)}{\|e_1(s_i) + k(s_i)e_2(s_i)(s_{i+1} - s_i)\|} \qquad (122)$$

$$e_2(s_{i+1}) = \frac{e_2(s_i) - k(s_i)e_1(s_i)(s_{i+1} - s_i) + T(s_i)e_3(s_i)(s_{i+1} - s_i)}{\|e_2(s_i) - k(s_i)e_1(s_i)(s_{i+1} - s_i) + T(s_i)e_3(s_i)(s_{i+1} - s_i)\|} \qquad (123)$$

At step 66 (S66), an increment i=i+1 is carried out.

At step 67 (S67), it is decided whether the data exists, and if the data exists, the routine advances to the processing of S63.

The information reproduction unit 22 does not actually hold $s_i$ as the data. The information reproduction unit 22 uses the same fact as that used at the time of a curve on a plane of two dimensions, and it can be solved similarly by sampling again the k(s) and τ(s) so that $s_{i+1}-s_i$ becomes equal to a constant.

Here, consider how a curved surface existing in a three-dimensional space should be expressed in the characteristic point coding unit 14.

However, the discussion will be made not about any curved surface, but instead will focus on the coding of the construction of a dynamic image. The assumed object is actually a curved surface exhibited by characteristic points obtained by analysis by multiple resolution, and is a three-dimensional space x-y-t in space-time. In this space, $$p(u,v)=(x(u,v),y(u,v),t(u,v)) \qquad (124)$$

is considered.

The following summary is based on the assumption that, in the characteristic point coding unit 14, a curve is formed by linking the curve on an x-y plane formed when cutting this curved surface at a certain t and specific points of curvature of that curve in the t-direction, and that curve is expressed by the curvature k.

The specific points of the curvature of the cut curve of curved surface which appear when cut from the group of these curves at any time t can be reproduced, and therefore the cut curve can also be reproduced. The curved surface can be constituted again by linking them.

First, in the characteristic point coding unit 14, one curved surface p(u, v) in the three-dimensional space is considered. When this is cut by t=ti, one or more cut curves of the curved surface are obtained. Each curve is a curve on the x-y plane, and therefore they can be reduced to specific point information of the initial values concerning the start point and curvature using the procedures of the previous section.

In the case of a closed curve, an appropriate location is considered to be the start point, and one of the specific points of curvature is set as the start point later. Attention should be paid to the start point, end point, and specific points of that cut curve, etc.

Next, the characteristic point coding unit 14 performs the same operation at t=$t_i$+1. The characteristic points of t=$t_i$ and t=$t_i$+1 formed in this way are linked.

The characteristic point coding unit 14 sets the neighborhood at the t=$t_i$+1 with a certain characteristic point of t=$t_i$ as the center when linking, links characteristic points if they exist there, or uses the neighborhood as the end point if no characteristic point exists.

On the other hand, there also exist a specific point newly appearing when t=$t_i$+1, and therefore the characteristic point coding unit 14 uses the specific point of t=$t_i$+1 not linked by the above-mentioned operation as the start point.

In this way, the curve was constituted on the curved surface, and the specific points of curvature on the cut curve when the cutting at any time t from these curves is carried out can clearly be reproduced. Accordingly, the cut curve can also be reproduced.

Below, essentially, the following steps are used.

Below, an explanation will be made of the algorithm of analysis of a curved surface in a three-dimensional space in the characteristic point coding unit 14.

Figure 15:
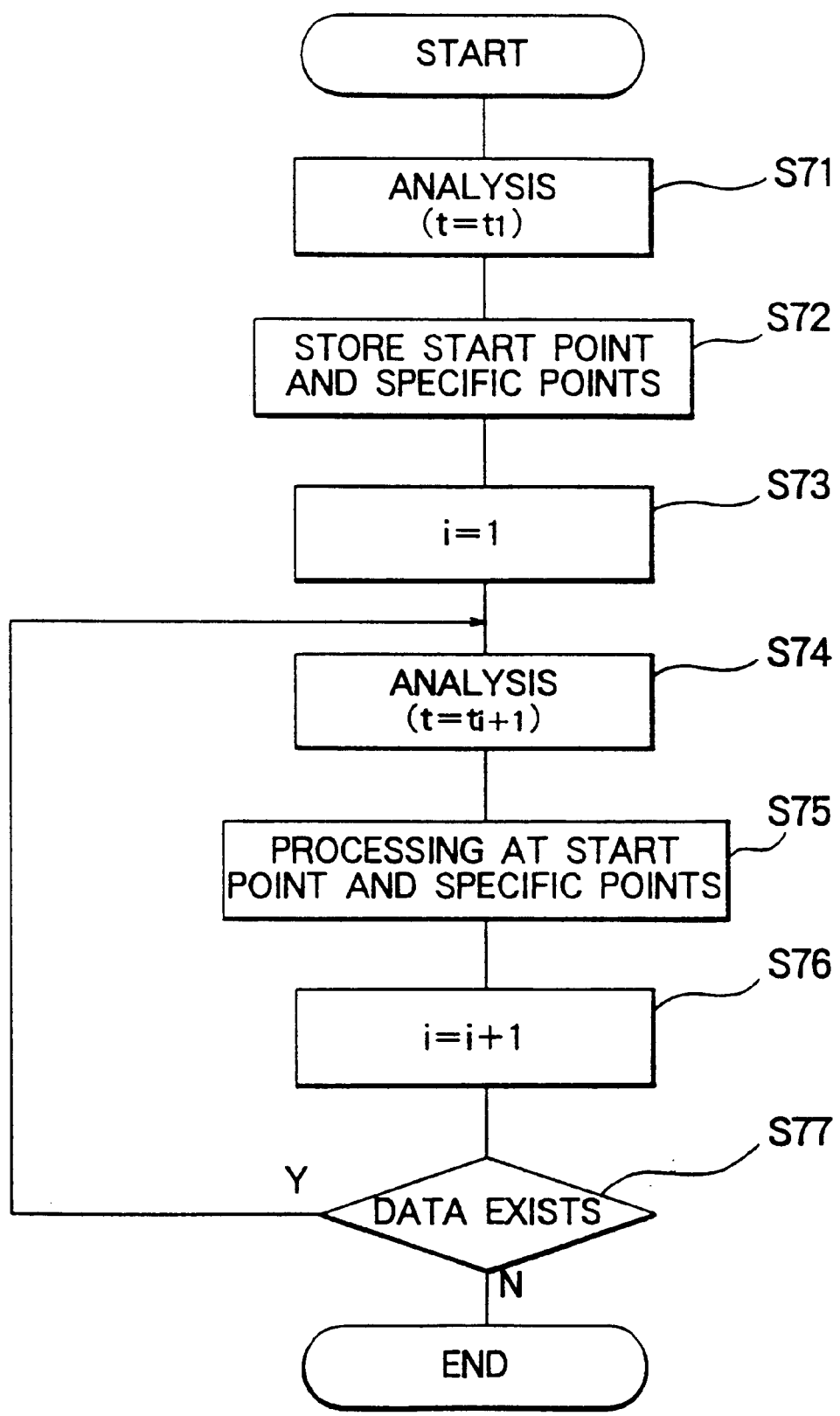
FIG. 15 is a view showing the analyzing processing of a curved surface in the three-dimensional space.

FIG. 15 is a flow chart showing the processing for analyzing a curved surface in a three-dimensional space in the characteristic point coding unit 14.

In FIG. 15, at step 71 (S71), the curved surface is cut when t=$t_1$, and the analysis is carried out for each of the formed curves using the algorithm of analysis of a curve on a two-dimensional plane mentioned above.

At step 72 (S72), the start point and specific point are stored as the start point of the curve in the t-direction.

At step 73 (S73), i=1 is set.

At step 74 (S74), the analysis is carried out for each of the curves formed by cutting the curved surface when t=$t_i$+1 using the algorithm of analysis of a curve on a two-dimensional plane, respectively.

At step 75 (S75), the position of the start point or the specific point appearing when t=$t_i$ and the start point and the specific point formed when t=$t_i$+1 are examined, and the following processing is carried out.

(a) They are linked when it is the same neighborhood.
  (b) If it is not the same neighborhood and there is a point newly appearing when t=$t_i$+1, it is stored as the start point.
  (c) If it is not the same neighborhood, the point existing when t=$t_i$ is stored as the end point.

At step 76 (S76), an increment i=i+1 is carried out.

At step 77 (S77), it is decided whether or not the data exists. If the data exists, the routine advances to the processing of S74.

The curve to the t-direction formed in this way is analyzed by using the algorithm of analysis of a curve in a three-dimensional space.

Below, an explanation will be made of the algorithm of synthesis of a curved surface in a three-dimensional space at the information reproduction unit 22.

Conversely, in the information reproduction unit 22, when a curved surface is synthesized, the following steps are performed.

Figure 16:
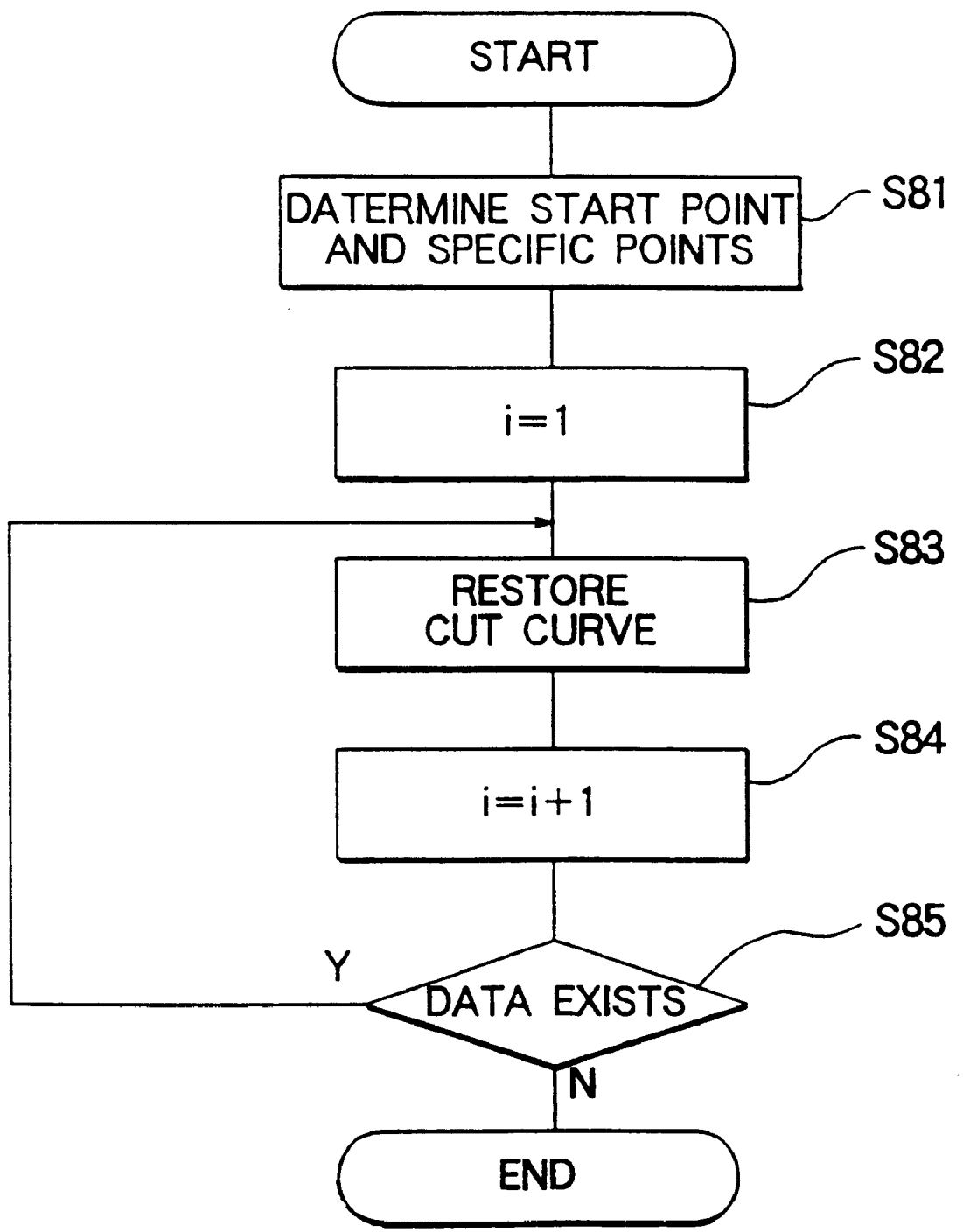
FIG. 16 is a view showing the synthesizing processing of a curved surface in the three-dimensional space.

FIG. 16 is a view showing the flow chart of the processing of synthesizing of a curved surface in a three-dimensional space.

In FIG. 16, at step 81 (S81), the curve formed in the t-direction is restored using the algorithm of synthesis of a curve in a three-dimensional space. By this, the start points and specific points of all of the cut curves of the curved surface when t=$t_i$ are determined.

At step 82 (S82), i=1 is set.

At step 83 (S83), cut curves are all restored from the start point and specific point of the curve cut when t=$t_i$.

Note, in this processing, the algorithm of synthesis of a curve on a two-dimensional plane is used.

At step 84 (S84), an increment i=i+1 is carried out.

At step 85 (S85), it is decided whether the data exists. If the data exists, the routine advances to the processing of S83.

Other than the above-mentioned embodiment, for example, as indicated as the modifications, the image processing apparatus and method of the present invention can take various structures. The embodiments mentioned above are examples.

What is claimed is:

1. A method of processing a dynamic image comprising steps of:

providing dynamic image information including a plurality of consecutive frames of two-dimensional image information, wherein each frame of the dynamic image information contains a two-dimensional image that has correspondence with two-dimensional position coordinates and time, wherein the plurality of consecutive frames has a time dimension based on their consecutive nature such that the dynamic image information is three dimensional;

analyzing each frame of the dynamic image information in a three-dimensional space having a two-dimensional image plane corresponding to the two-dimensional position coordinates and a time axis corresponding to the time dimension to obtain three-dimensional image information relating to changes in luminance between successive frames of the dynamic image information by performing a first-order differentiation and then a second-order differentiation of the dynamic image information;

detecting characteristic points corresponding to extrema values of the three-dimensional image information by determining zero-crossing points at which results of the step of analyzing are zero, each of the characteristic points having three-dimensional information including time and positional information;

compressing the positional information of the characteristic points to obtain compressed positional information;

compressing three-dimensional image information relating to the results of the step of analyzing to obtain compressed three-dimensional information; and coding both the compressed three-dimensional information and the compressed positional information.

2. A method of processing a dynamic image as set forth in claim 1, wherein the step of analyzing each frame of the dynamic image information includes using a multiple-order filter function that performs a multiple resolution analysis corresponding to the first-order differentiation and the second-order differentiation.

3. A method of processing a dynamic image as set forth in claim 2, wherein the multiple resolution analysis includes a convolution computation of a function obtained from a first-order differentiation of a Gaussian smoothing function for the three-dimensional image information with a function formed of the three-dimensional image information.

4. A method of processing a dynamic image as set forth in claim 1, wherein the step of detecting characteristic points includes a convolution computation of a function formed of the three-dimensional image information with a function obtained from a second-order differentiation of a Gaussian smoothing function for the three-dimensional image information and detection of zero-crossing points corresponding to results of zero for the convolution computation.

5. A method of processing a dynamic image as set forth in claim 1, wherein the step of compressing the positional information of the characteristic points includes compressing any redundancy in data contained in the positional information.

6. A method of processing a dynamic image as set forth in claim 1, wherein, for a subset of the characteristic points which can be treated as a line which includes the subset of the characteristic points, the step of compressing the positional information of the characteristic points includes using positional information of a start point of the line and a relationship between predetermined lengths on the line to the characteristic points of the subset including lengths in each of the three dimensions.

7. A method of processing a dynamic image as set forth in claim 1, wherein, for a subset of the characteristic points which can be treated as a line containing the subset of the characteristic points, the step of compressing the positional information of the characteristic points includes using positional information of a start point of the line, a relationship between predetermined lengths on the line to the characteristic points of the subset, a curvature, and a torsion of the line.

8. A method of processing a dynamic image as set forth in claim 1, wherein, for a subset of the characteristic points which can be treated as a surface which includes the subset of the characteristic points, the step of compressing the positional information of the characteristic points is carried out by dividing the characteristic points present on the surface into partial sets of characteristic points having a predetermined relationship between distances from each of two planes containing the two-dimensional image to the characteristic points on the surface.

9. A method of processing a dynamic image as set forth in claim 1, wherein, for a subset of the characteristic points which can be treated as a surface which includes the subset of the characteristic points, the step of compressing the positional information of the characteristic points includes division of the characteristic points into partial sets of characteristic points present on lines of the surface cut by two planes containing the two-dimensional image, and the compression of the positional information is expressed as a function defined by a relationship between the positional information of a start point of each of the lines of the surface cut by the two planes and a curvature of those lines.

10. A method of processing a dynamic image as set forth in claim 1, wherein, for a portion of the three-dimensional information of the characteristic points where a subset of the characteristic points can be treated as a line, the step of compressing the three-dimensional image information of the characteristic points includes compressing a function defined by a relationship between a predetermined length from a start point of the line and the three-dimensional image information of the characteristic points.

11. A method of processing a dynamic image as set forth in claim 1, wherein, for a portion of the three-dimensional information of characteristic points where a subset of the characteristic points can be treated as a surface, the step of compressing the three-dimensional image information of the characteristic points includes compressing a function defined by a relationship between two planes that include combinations of the time dimension of the three dimensions and the other two dimensions of the three dimensions.

12. A method of synthesis of a dynamic image comprising steps of:

providing compressed signals produced by analyzing dynamic image information of each frame of a plurality of consecutive frames of two-dimensional image information to produce three-dimensional image information that corresponds with a three-dimensional space having a two-dimensional image plane and a time axis by performing a first-order differentiation and then a second-order differentiation of the dynamic image information, detecting characteristic points corresponding to extrema values of the three-dimensional image information by determining zero-crossing points at which results of the analysis of the dynamic image information are zero, each characteristic point having three-dimensional information including time and positional information, compressing the positional information of the characteristic points to obtain compressed positional information, and compressing and coding the three-dimensional image information by mathematically coding the three-dimensional image information of the characteristic points;

restoring the positional information of the characteristic points by decompressing the compressed positional information of the characteristic points;

restoring the three-dimensional image information of the characteristic points by decompressing and decoding the compressed and coded three-dimensional image information of the characteristic points; and restoring the three-dimensional image information corresponding to the plurality of consecutive frames of the original dynamic image information including the two-dimensional image plane and the time axis from the three-dimensional image information of the characteristic points by interpolating the three-dimensional image information based on the positional information of the characteristic points.

13. A method of synthesis of a dynamic image as set forth in claim 12, wherein, for a subset of the characteristic points which can be treated as included in a line, the three-dimensional image information restored from the subset of the characteristic points is obtained by restoring a function defined by a relationship between lengths from a predetermined position on the line to the characteristic points in each of the three dimensions.

14. A method of synthesis of a dynamic image as set forth in claim 12, wherein, for a subset of the characteristic points which can be treated as included in a surface, the three-dimensional image information restored from the subset of the characteristic points is obtained by restoring a function defined by two planes that include combinations of two of the three dimensions and the three-dimensional image information.

15. A method of synthesis of a dynamic image as set forth in claim 12, wherein for a subset of the characteristic points which can be treated as included in a line, the positional information of the characteristic points are restored by restoring a function defined by the positional information of a start point of the line and a relationship between lengths from a predetermined position on the line to the characteristic points in each of the three dimensions.

16. A method of synthesis of a dynamic image as set forth in claim 12, wherein for a subset of the characteristic points which can be treated as included in a surface, the positional information of the characteristic points are restored by restoring partial sets of characteristic points on the surface defined by a predetermined relationship between distances from two planes, wherein the two planes include combinations of the time dimension of the three dimensions and the other two dimensions, to the characteristic points on the surface.

17. A method of synthesis of a dynamic image as set forth in claim 12, wherein for a subset of the characteristic points which can be treated as included in a line, the positional information of the characteristic points are restored by restoring a function defined by the positional information of a start point of the line and a relationship between lengths from a predetermined position on the line to the characteristic points of the subset, curvature, and torsion of the line.

18. A method of synthesis of a dynamic image as set forth in claim 12, wherein for a subset of the characteristic points which can be treated as included in a surfaces the positional information of the characteristic points are restored by restoring a line including the characteristic points of curvature of a line of the surface cut by a plane including a combination of two of the three dimensions and by restoring the line of the surface cut by the plane from a set of points of the line cut by the plane.

19. An apparatus for analysis of a dynamic image, comprising:

means for analyzing dynamic image information by analyzing each frame of a plurality of consecutive frames of two-dimensional image information in a three-dimensional space having a two-dimensional image plane representing the two-dimensional image information of each of the frames and a time axis corresponding to a time dimension based on the consecutive nature of the plurality of frames to obtain three-dimensional image information relating to changes in luminance between successive frames of the dynamic image information, wherein the means for analyzing performs a first-order differentiation and then a second-order differentiation of the dynamic image information;

means for detecting characteristic points corresponding to extrema values of the three-dimensional image information by determining zero-crossing points at which results of the step of analyzing are zero, each characteristic point having three-dimensional information including time and positional information;

means for compressing the positional information of the characteristic points to obtain compressed positional information; and means for compressing and coding three-dimensional image information corresponding to the characteristic points.

20. An apparatus for analysis of a dynamic image as set forth in claim 19, wherein the means for analyzing includes local analysis means for analyzing the dynamic image information using a multiple resolution analysis method.

21. An apparatus for analysis of a dynamic image as set forth in claim 19, wherein the means for analyzing includes first-order differentiation means and convolution computation means for performing convolution computation of a function obtained from a first-order differentiation of a Gaussian smoothing function for the three-dimensional image information with a function formed of the three-dimensional image information.

22. An apparatus for analysis of a dynamic image as set forth in claim 19, wherein the means for detecting includes second-order differentiation means and convolution computation means for performing a convolution computation of a function obtained from second-order differentiation of a Gaussian smoothing function for the three-dimensional image information with a function formed of the three-dimensional image information.

23. An apparatus for analysis of a dynamic image as set forth in claim 22, wherein, for a subset of the characteristic points which can be treated as a line which includes the subset of the characteristic points, the means for compressing the positional information defines the line by positional information of a start point of the line and a relationship between predetermined lengths on the line to the characteristic points of the subset including length quantity values in each of the three dimensions.

24. An apparatus for synthesis of a dynamic image from compressed signals that were produced by analyzing a plurality of consecutive frames of two-dimensional image information as three-dimensional image information that corresponds with a three-dimensional space having a two-dimensional image plane and a time axis, by detecting characteristic points corresponding to extrema values of the three-dimensional image information, each of the characteristic points having three-dimensional information including time and positional information, by compressing the positional information of the characteristic points to obtain compressed positional information, and by compressing and coding the three-dimensional image information by mathematically coding the three-dimensional image information of the characteristic points, the apparatus for synthesis comprising:

means for restoring the positional information of the characteristic points by decompressing the compressed positional information of the characteristic points, the characteristic points corresponding to points at which first order differentiation and second order differentiation of the three-dimensional image information are zero;

means for restoring the three-dimensional image information of the characteristic points by decompressing and decoding the compressed and coded three-dimensional image information of the characteristic points to obtain restored three-dimensional image information; and means for restoring the original dynamic image information comprising a two-dimensional image plane and a time axis from the restored three-dimensional image information by interpolating the three-dimensional image information based on the positional information of the characteristic points.

25. An apparatus for synthesis of a dynamic image as set forth in claim 24, wherein, for a subset of the characteristic points which can be treated as included in a line, the means for restoring the three-dimensional image information restores the three-dimensional image information by restoring a function defined by a relationship between lengths from a predetermined position on the line to the characteristic points in each of the three dimensions.

26. An apparatus for synthesis of a dynamic image as set forth in claim 24, wherein, for a subset of the characteristic points which can be treated as included in a surface, the means for restoring the three-dimensional image information restores the three-dimensional image information by restoring a function defined by two planes including combinations of two of the three dimensions, with one dimension excluded, and the three-dimensional image information.

27. An apparatus for synthesis of a dynamic image as set forth in claim 24, wherein, for a subset of the characteristic points which can be treated as included in a line, the means for restoring the positional information restores a function defined by the positional information of a start point of the line and a relationship between lengths from a predetermined position on the line to the characteristic points in each of the three dimensions.

28. An apparatus for synthesis of a dynamic image as set forth in claim 24, wherein, for a subset of the characteristic points which can be treated as included in a surface, the means for restoring the positional information restores partial sets of characteristic points on the surface defined by characteristic points having a predetermined relationship with distances from two planes, including combinations of the time dimension of the three dimensions and the other two dimensions, to the characteristic points on the surface.

29. An apparatus for synthesis of a dynamic image as set forth in claim 24, wherein, for a subset of the characteristic points which can be treated as included in a line, the means for restoring the positional information restores a function defined by the positional information of a start point of the line and a relationship between lengths from a predetermined position on the line to the characteristic points, curvature, and torsion of the line.

30. An apparatus for synthesis of a dynamic image as set forth in claim 24, wherein, for a subset of the characteristic points which can be treated as included in a surface, the means for restoring the positional information restores a line formed by characteristic points of curvature of a line of the surface cut by a plane formed by a combination of two of the three dimensions and restores the cut line from a set of points of the line cut by the plane.

\* \* \* \* \*